United States Patent [19]
Shinohara

[11] Patent Number: 6,067,298
[45] Date of Patent: May 23, 2000

[54] ATM SWITCHING SYSTEM WHICH SEPARATES SERVICES CLASSES AND USES A CODE SWITCHING SECTION AND BACK PRESSURE SIGNALS

[75] Inventor: Masayuki Shinohara, Tokyo, Japan

[73] Assignee: NEC Corporation, Japan

[21] Appl. No.: 08/956,064

[22] Filed: Oct. 22, 1997

[30] Foreign Application Priority Data

Oct. 23, 1996 [JP] Japan .................................. 8-279763

[51] Int. Cl.[7] .......................... H04L 12/28; H04L 12/56; H04L 12/50; H04Q 11/00
[52] U.S. Cl. .......................... 370/395; 370/366; 370/388; 370/413; 370/236
[58] Field of Search .................................. 370/230, 236, 370/235, 395, 231, 412, 413, 387, 388, 366

[56] References Cited

U.S. PATENT DOCUMENTS

| | | | |
|---|---|---|---|
| 5,583,861 | 12/1996 | Holden | 370/395 |
| 5,838,677 | 11/1998 | Kozaki et al. | 370/389 |
| 5,938,749 | 8/1999 | Rusu et al. | 710/54 |

OTHER PUBLICATIONS

R. Fan, et al., "Expandable ATOM Switch Architecture (XATOM) for ATM LANs", 1994 IEEE, pp. 402–409.

*Primary Examiner*—Douglas W. Olms
*Assistant Examiner*—David R Vincent
*Attorney, Agent, or Firm*—Ostrolenk, Faber, Gerb & Soffen, LLP

[57] ABSTRACT

An asynchronous transfer mode switching system including a core switch section (CS102) in an output buffer-type configuration which has an ATM switching function between high-rate input and output ports, an input buffer module section (IXB20) which multiplexes plural low-rate input line to the high-rate input port of the core switch section, and an output buffer module section (OXB30) which separates the output of a high-rate output port of the CS into plural low-rate output lines. The IBX enables queuing for each output line and each service class. The OXB enables queuing for output line and service class accommodated by itself. When the buffer occupancy exceeds a threshold value, the OXB originates a cell inhibiting signal to the CS. When the queue length for each output port exceeds a threshold value, the CS originates the cell inhibiting signal to all IXBs. The IXB controls to stop a cell transmission according to the cell inhibiting signal. An execution throughput is increased by suppressing occurrence of congestion inside an ATM exchange. The evenness of throughput is guaranteed between virtual channels using the same output line.

25 Claims, 22 Drawing Sheets

FIG.2

| CLASS | DESTINATION LINE | ENTIRE QUEUE LENGTH | VIRTUAL SWITCH INTERNAL QUEUE LENGTH | VC#1 | VC#2 | VC#3 | VC#4 | VC#5 | - - - - - |
|---|---|---|---|---|---|---|---|---|---|
| | | | | | | | | | |

| CLASS | GLOBAL QUEUE LENGTH | OUTPUT LINE CORRESPONDING QUEUE LENGTH IN INPUT PORT #1 | ...... |
|---|---|---|---|
| | | | |

203

| CLASS | DESTINATION LINE | OCCUPANCY |
|---|---|---|
| | | |

202

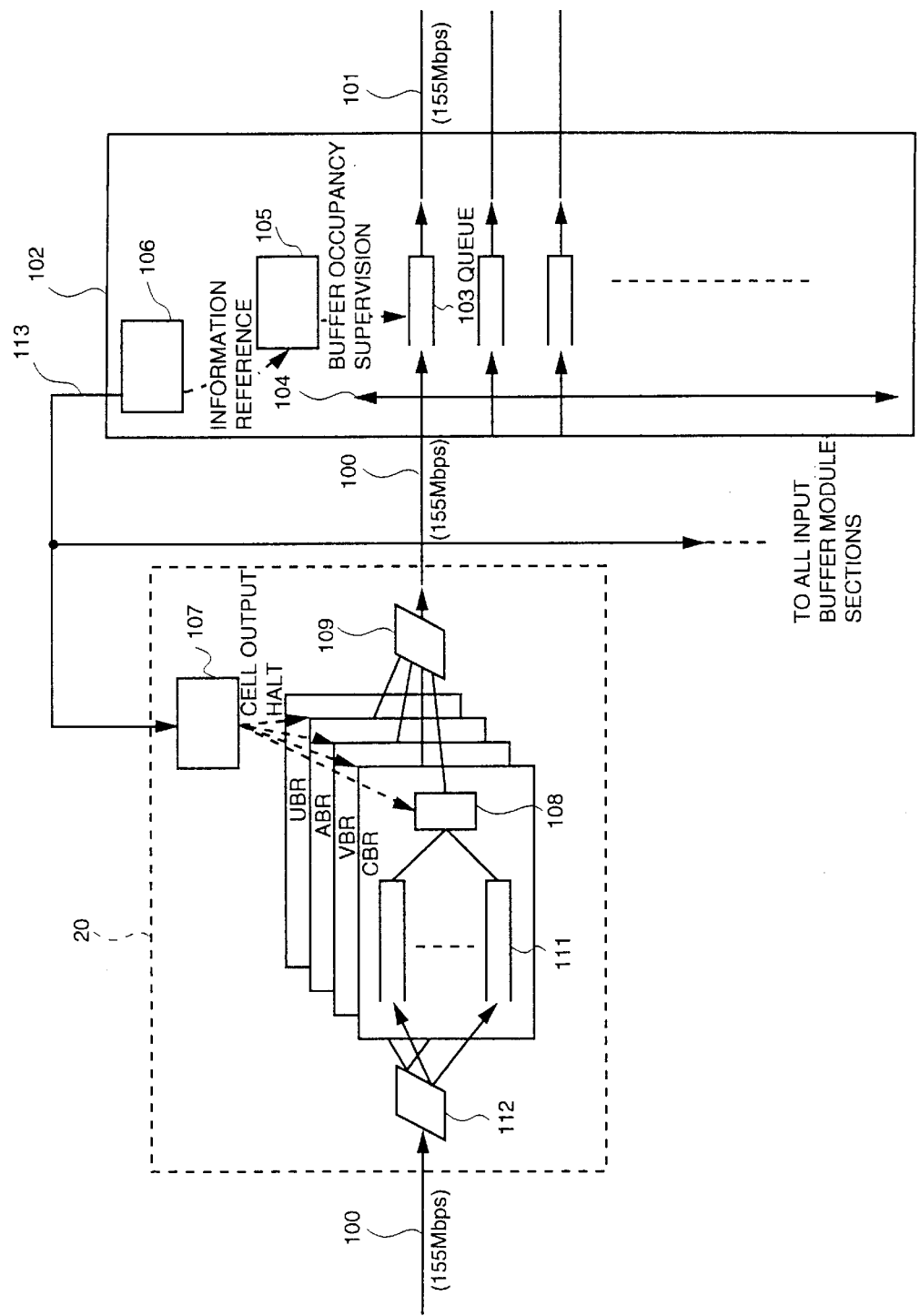

ATM SWITCHING SYSTEM WHICH SEPARATES SERVICES CLASSES AND USES A CODE SWITCHING SECTION AND BACK PRESSURE SIGNALS

BACKGROUND OF THE INVENTION

The present invention relates to an ATM (asynchronous transfer mode) switching system.

In conventional ATM switching systems with a small switching capacity of about 2.4 Gbps, the dominant systems are of a simple input/output buffer type, as shown in FIG. 22, in which a high rate time division multiplex bus directly accommodates a low rate line interface usable by a user terminal.

The cell switching operation of an ATM (Asynchronous Transfer Mode) switching system with the conventional configuration will be described below. A class/line separator 112 identifies ATM cells flowed through the input line 110 by their destination output lines and service class types and then stores them to proper output line corresponding queues 111.

The rotation priority control section 108 controls such that a cell sending right is handed over in rotation between output line corresponding queues 111 belonging to the same service class. The interclass priority control section 109 controls competition for cell sending requests between different service classes in accordance with a predetermined priority control theory.

There are CBR (Constant Bit Rate), VBR (Variable Bit rate), ABR (Available Bit Rate), and UBR (Unspecified Bit Rate) as the service class.

The ATM cells, which are selected through a combination process of the rotation priority control section 108 and the interclass priority control section 109 and taken from the output line corresponding queue 111, are stored into the core switch queue 103 corresponding to the destination output line via the time division multiplex bus 104.

The core switch key 103 sequentially sends out ATM cells from the leading cell to the output line 101. The buffer occupancy computing section 105 in the core switch section 102 observes the queue length (buffer occupancy) of the core switch queue 103. The back pressure originating section 106 refers to the queue length information of the core switch key 103 holding the buffer occupancy computing section 105, and then originates the back pressure signal 113 specifying an output line in a congestion state to all input buffer module sections 110 when it detects that a core switch queue 103 in a congestion state exists because of the queue length exceeding a threshold value.

The back pressure receiving section 107 in the input buffer module section 110 specifies the output line originating a back pressure signal based on back pressure signal information received, and then reports the rotation priority control section 108 to inhibit sending cells from the output line corresponding queue 111 corresponding to the output line.

As described above, as traffic control between an input buffer and an output buffer in an ATM switching system with the conventional configuration, there has been only the simple back pressure control which originates a back pressure signal instructing to halt the outputting of a cell to a specific output line to all input buffer modules, in order to prevent the cell loss in the output buffer in the case of congestion of the specific output line.

In order to increase the switching capacity, the conventional method described above is made of the scheme of accommodating many low rate interfaces using higher rate time division multiplex bus. However, because the increasing number of input/output signals on the time division multiplex bus causes, for example, a shortage of the number of pins, it is difficult to realize the scheme in view of packaging on LSTS.

The conventional ATM switching system frequently originates back pressure signals to prevent a cell loss occurring in the output buffer because congestion occurs frequently because of simultaneous arrival of ATM cells to the same line from plural input lines.

Basically, the back pressure control has the effect of equalizing the throughput issued from each input line to the same output line. When the number of VCs (Virtual Channels) connected to the same output line is varied between input lines, the throughput evenness cannot be secured between VCs using the same output lines. Hence, in the conventional ATM switching system, the problem is that frequent occurrence of the back pressure signals causes the throughput evenness.

SUMMARY OF THE INVENTION

The objective of the present invention is to solve the above-mentioned problems. The objective of the invention is to provide an ATM switching system that can easily increase its switching capacity and an effective throughput by suppressing occurrence of congestion inside an ATM exchange, so that the throughput evenness can be guaranteed between virtual channels using the same output lines.

The objective of the present invention is achieved by the ATM switching system comprising a switch section for storing an ATM cell into a buffer to implement an ATM cell exchange between an input port and an output port at a predetermined transmission rate; an input buffer module section having a buffer that multiplexes plural input lines with a transmission rate slower than the predetermined transmission rate to the input port of the switch section and then stores the ATM cell; and an output buffer module section having a buffer that separates an output from the output port of the switch section into plural output lines with a transmission rate slower than the predetermined transmission rate and then stores the ATM cell; the input buffer module section which enables queuing from the ATM cell to the buffer for each of the output lines and for each service class accommodated by the input buffer module section itself; the output buffer module section which enables queuing to the buffer for each destination output line and for each service class; the output buffer module section including means for originating a cell inhibit signal to the switch section when the total occupancy of the buffer exceeds a predetermined threshold value; queues respectively placed for the output lines; and means for originating a cell inhibit signal to all the input buffer module sections when the length of each of the queues exceeds a predetermined threshold value; the switch section including queues respectively placed for the output ports; means for originating a cell inhibit signal to all the input buffer module section when each of the queues exceeds a predetermined threshold value; and halt control means for halting a cell transmission to the output buffer module section to which the cell inhibit signal has originated; the input buffer module section including the output port to which the cell inhibit signal is originated; and halt control means for halting a cell transmission to the output line.

According to the ATM switching system, the input buffer module section further comprises an output line corresponding queues respectively placed for the output lines, and a virtual queue being a set of queues for the same output port among the queues. The output buffer module section further comprises rate computing means for periodically computing an acceptable rate of a queue for each of the output lines in the output buffer module section.

According to the ATM switching system, the rate computing means periodically computes an acceptable rate for each service class based on a status time change of the virtual queue by service class or the output line corresponding queue of the output buffer module section. The input buffer module section further includes an internal rate control means that controls a cell transmission for each output line based on the acceptable rate.

According to the ATM switching system, the output line corresponding queue has a double structure including a first queue and a second queue in the input buffer module section. The internal rate control means is placed between the first queue and the second queue to control cell transfer from the first queue based on the virtual queue or an acceptable rate computed by means of the rate computing means in the output buffer module section.

According to the ATM switching system, among a product of an acceptance rate computed using the virtual queue for an output port corresponding to the output line corresponding queue and the number of active logical channels in which a cell is stored into an output line corresponding queue in the output buffer module section corresponding to the output line corresponding queue at a current time and a product of an acceptable rate computed using an output line corresponding queue in the output buffer module section corresponding to said output line corresponding queue and the number of active logical channels in the output line corresponding queue, a smaller product is used as a transfer rate to be set to the internal rate control means in the output line corresponding queue within the input buffer module section.

Moreover, according to the ATM switching system, the buffer occupancy of an output line corresponding queue of the input buffer module section is observed for each logical channel, and discards a packet when a buffer occupancy of the logical channel of the packet in the output line corresponding queue exceeds a predetermined threshold value upon arrival of the leading cell of the packet to the output line corresponding queue.

According to the ATM switching system, a value obtained by dividing a fixed threshold value by the number of active logical channels of the output line corresponding queue is used as a value compared with a buffer occupancy of the logical channel of the packet in the output line corresponding queue of the input buffer module section.

In order to solve the above-mentioned problem, according to the present invention, the ATM switching system comprises a core switch section in an output buffer-type configuration for realizing ATM cell exchanges between high rate input and output ports; an input buffer module section for multiplexing plural low-rate input lines to a high-rate input port in the core switch section; and an output buffer module for separating an output from a high-rate output port in the core switch section into plural low rate output lines; the input buffer module section enabling queuing for each output line and for each service class; the output buffer module section enabling queuing for each output line and for each service class accommodated by the output buffer module section itself.

In order to prevent a cell loss in the core switch section and the output buffer module section within the ATM switching system with above-mentioned configuration, a back pressure signal is originated to all extended input buffer module sections when the core switch queue length prepared for each output port in the core switch section exceeds a threshold value. Moreover, a back pressure signal is originated to the core switch section when the total buffer occupancy in the output buffer module section exceeds a threshold value. Moreover, a back pressure signal is originated to all the input buffer modules when each output line corresponding queue length in the output buffer module section exceeds a threshold value. The input buffer module section prepares back pressure control under which a cell to be output to the output port or output line originating a back pressure signal is suspended. The core switch section prepares back pressure control under which a cell to be output to the output buffer module section originating a back pressure signal is suspended.

In order to increase the throughput for each output line by suppressing frequent occurrence of internal congestion in the ATM switching system with the above-mentioned configuration and to improve the throughput evenness between virtual channels using the same output line, and to use effectively the buffer in the output buffer module section, the rate computing function is prepared that respectively and periodically computes a virtual queue (global queue) being a set of output line corresponding queues for the same output port among all output line corresponding queues in the input buffer module sections, as well as an acceptable rate in the output line corresponding queue within the output buffer module section. The output line corresponding queue within the input buffer module section has a double structure formed of a virtual source queue and a virtual switch internal queue. The rate control section placed between the virtual source queue and the virtual switch internal queue controls cell transfer from the virtual source queue to the virtual switch internal queue based on an acceptable rate computed using a global queue or an output line corresponding queue in the output buffer module section.

In order to perform uniform rate control between logical channels (VC) by means of the rate control section in the input buffer module section, the buffer occupancy of the output line corresponding queue within the input buffer module section is observed for each logical channel (VC). Thus, when the buffer occupancy of the logical channel (VC) in a packet exceeds a threshold value upon arrival of the leading cell of the packet to the output line corresponding queue in the input buffer module section, the packet is discarded.

BRIEF DESCRIPTION OF THE DRAWINGS

This and other objects, features and advantages of the present invention will become more apparent upon a reading of the following detailed description and drawings, in which:

FIG. 2 is a diagram showing the configuration of a buffer occupancy information table held by the buffer occupancy computing section in the input buffer module section according to the embodiment in FIG. 1;

FIG. 4 is a diagram showing the configuration of a buffer occupancy information table held by the input buffer occupancy computing section in the output buffer module section according to the embodiment in FIG. 1;

FIG. 22 is an ATM switching system with a conventional configuration.

DESCRIPTION OF THE EMBODIMENTS

Next, an embodiment of the present invention will be described below in detail with reference to the attached drawings.

Figure 1:
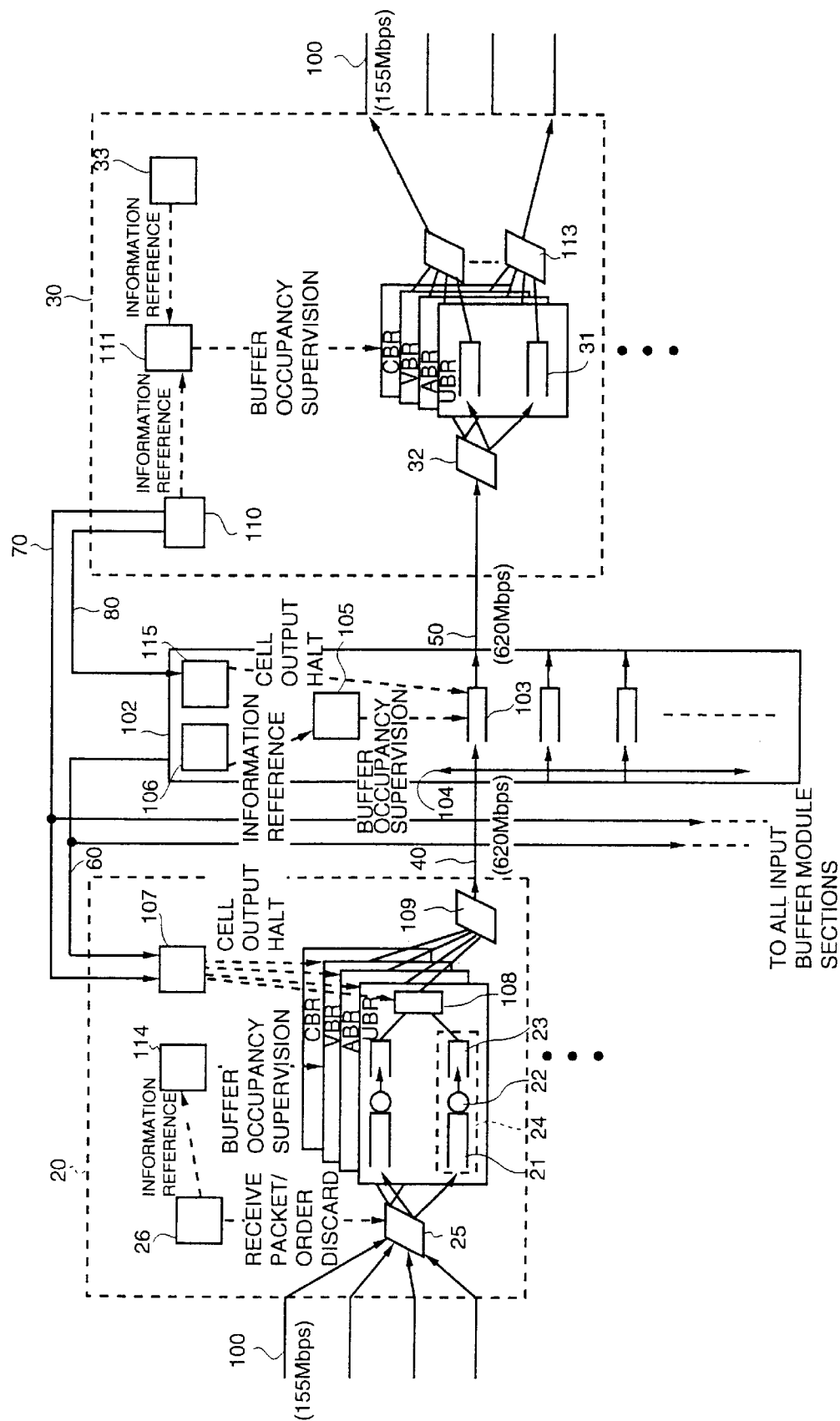
FIG. 1 is a block diagram showing an ATM switching system according to an embodiment of the present invention.

FIG. 1 is a block diagram showing the configuration of an ATM switching system according to an embodiment of the present invention. The ATM switching system consists of a core switch section (CS section) 102, an input buffer module section (IXB section) 20, and an output buffer module section (OXB section), 30.

The core switch section 102 is a simple switch of the output buffer type which provides an ATM cell switching function between a high-rate input port and a high-rate output port. The input buffer module section 20 multiplexes plural low rate input lines 100 and mediates in connection to the high-rate input port of the input buffer module section 102. The core switch section 102 includes an output circuit corresponding queue 24 to enable a queuing operation for each output line. The multi-service class environment can be easily provided by preparing the output line corresponding queue 24 by each service class. In the present embodiment, the output line corresponding queues 24 are prepared corresponding to four service classes (CBR, VBR, ABR, UBR). The output line corresponding queue 24 can be prepared by a desired number of service classes.

The input buffer module section 20 includes a buffer occupancy computing section 114 for observing the buffer occupancy for each of VCs in each output line corresponding queue 24 and a packet acceptance control section 26 for controlling a packet selection discard based on the observed buffer occupancy.

The output line corresponding queue 24 in the input buffer module section 20 has a double configuration including a virtual source queue 21 and a virtual switch internal queue 23 sandwiching a rate control section 22. The rate control section 22 controls the cell transfer rate from the virtual source queue 21 to the virtual switch internal queue 23, to a designated rate.

The output buffer module section 30 aims at separating the traffic from a high-rate output port 50 of the core switch section 102 into plural low-rate output lines 101. The output line corresponding queue 31 enables queuing for each output line accommodated by itself. Like the input buffer module section 20, the output buffer module section 30 can easily provide the multi-service class environment by preparing the output line corresponding queue 31 for each service class.

The output buffer module section 30 includes a virtual queue (global queue) formed of a set of output line corresponding queues 24 for the same output port among the output line corresponding queues 24 in all the input buffer module sections 20, and an acceptable rate computing section 33 for computing an acceptable rate in the output line corresponding queue 31 within the output buffer module section 30.

The output buffer module section 30 uses a completely-shared buffer Scheme in which each logical queue can freely use the full buffer capacity. The input buffer module section 20 has the structure that sets an upper limit for each logical queue so that a specific logical queue cannot monopolize the full buffer capacity.

The cell switching operation of an ATM switching system according to the present invention will be explained below. In the input buffer module section 20 accommodating plural input lines 100, the class/line separator 25 identifies the destination output line and the service class type of an ATM cell flowing from the input line 100, and stores it into a proper output line corresponding queue 24. The output line corresponding queue 24 is formed of a virtual source queue 21, a rate control section 22, and a virtual switch internal queue 23.

The ATM cell is first stored into the virtual source queue 21, and is moved from the virtual source queue 21 to the virtual switch internal queue 23 at a transfer rate provided by the rate control section 22. The rotation priority control section 108 controls such that the cell transfer right is taken in turn between the output line corresponding virtual switch internal queues 23 belonging to the same service class. The interclass priority control section 109 controls the competition between cell transfer requests from different service classes according to a predetermined priority control logic.

The ATM cell taken from the virtual switch internal queue 23 selected by means of a combination process of the rotation priority control section 108 and the interclass priority section 109 is stored into the core switch queue 103 corresponding to the destination output port via the time division multiplex bus 104. The core switch queue 103 transmits the ATM cells to the successive output buffer module 30 through the output port 50, in order of the leading cell.

In the buffer module 30, the class/line separator 32 identifies the destination output line and the service class type of an ATM cell, and stores a proper output line corresponding queue 1. The interclass priority control section 113 prepared for output line selects a service class to be next transmitted among output line corresponding queues 31 in each service class storing cells for the same output line, according to a predetermined priority control logic, and then transmits the leading cell to the output line 101.

Figure 3:
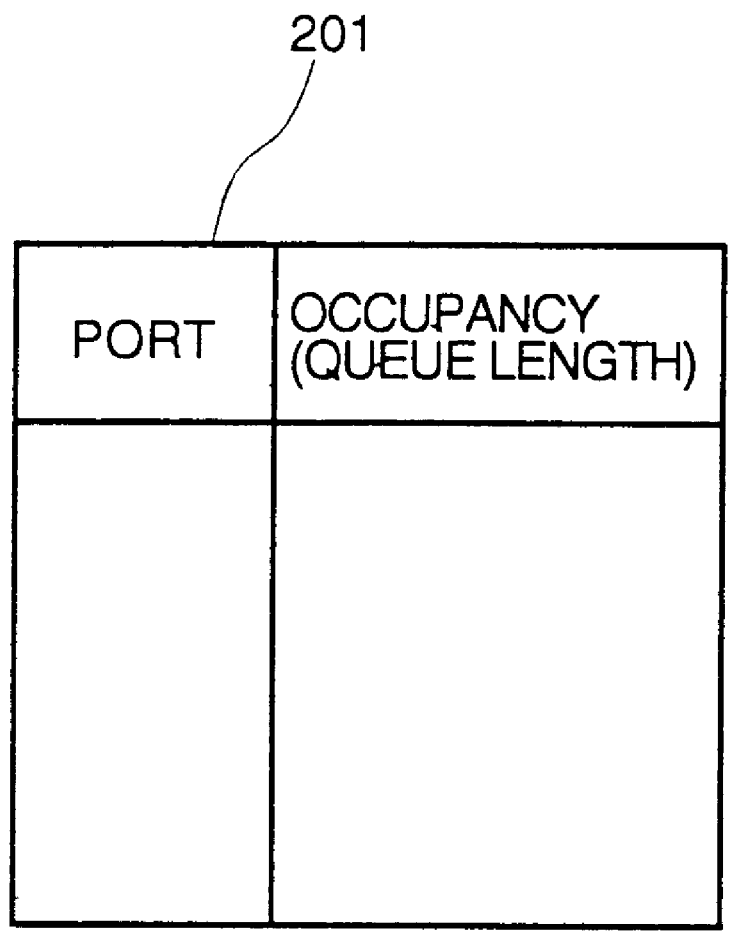
FIG. 3 is a diagram showing the configuration of a buffer occupancy information table held by the buffer occupancy computing section in the core switch section according to the embodiment in FIG. 1.

FIG. 2 illustrates an example of information contents held by the buffer occupancy computing section 114 in the input buffer module section 20. FIG. 3 illustrates an example of information contents held by the buffer occupancy computing section 105 in the core switch section 102. FIG. 4 illustrates an example of information contents held by the buffer occupancy computing section 111 in the output buffer module 30. The buffer occupancy computing section 114 in the input buffer module section 2, as shown in FIG. 2, holds the entire queue length including the virtual source queue 21 and the virtual switch internal queue 23 in the output line corresponding queue 24 of each service class, virtual switch internal queue length, the buffer occupancy of the entire queue length for each VC, and the like.

The buffer occupancy computing section 105 in the core switch section 102, as shown in FIG. 3, has the queue length of each core switch queue 103. The buffer occupancy computing section 111 in the output buffer module section 30, as shown in FIG. 4, stores the buffer occupancy 202 in the output line corresponding queue 31 of each service class as well as each output line corresponding queue length 203 forming the global queue for the output buffer module section 30.

Figure 5:
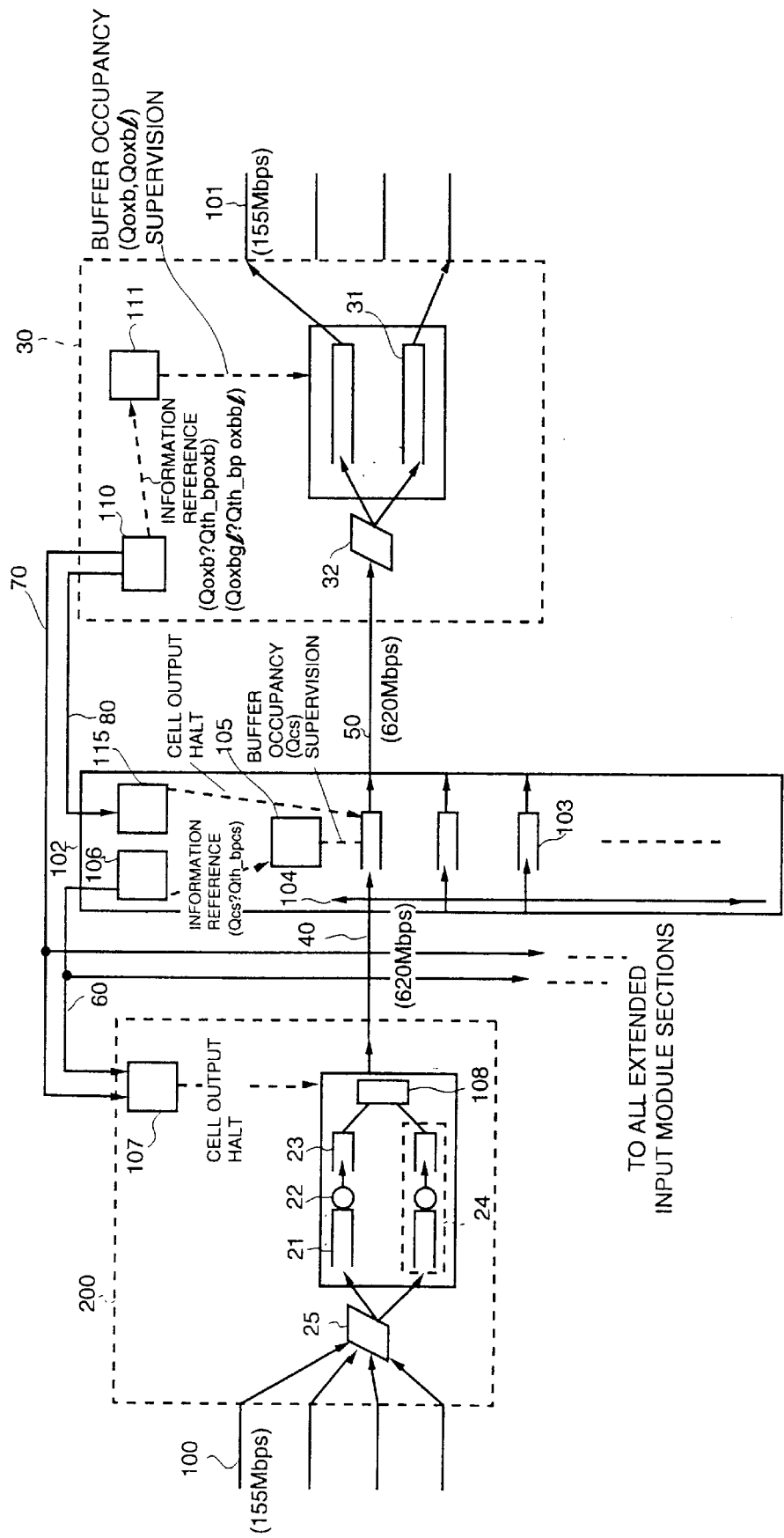
FIG. 5 is a morphological diagram showing the back pressure control according to the embodiment in FIG. 1.

FIG. 5 is a schematic diagram showing the back pressure control in an ATM switching system according to the present invention. For the brief explanation, the configuration is shown as to the case where only one service class exists. In the core switch section 102, when the queue length Qcs of the core switch queue 103 prepared for each output port 50 exceeds the threshold value Qth_bpcs, a back pressure signal (BP_CS) 60 is originated to all the input buffer module section 20.

The input buffer module section 20 stops transmitting cells to the output port which has originated the BP_CS signal. In the environment where plural service classes exist in a mixed state, control can be performed according to various service class quality requests by preparing the threshold value Qth_bpcs for each service class or applying one BP_CS signal to plural service classes.

On the other hand, when the total buffer use amount Qoxb exceeds the threshold value Qth_bpoxb, the output buffer module section 30 originates a back pressure signal (BP_OXB) to the core switch queue 102 at the previous stage.

When receiving the BP_OXB signal 80, the core switch queue 103 ceases to output a cell to the successive output buffer module section 30 which has originated it. In each output line corresponding queue within the output buffer module section 30, when the queue length Qoxbl exceeds the threshold value Qth_bpoxbl, the output buffer module section 30 originates the back pressure signal (BP_OXBL) 70 to all input buffer module sections.

The input buffer module section 20 ceases to transmit cells to the output line to which the BP_OXBL signal 70 has been originated. Since the Qth_bpoxbl can be independently prepared for each output line corresponding queue prepared by service class, control can be performed according to a variety of service class quality requests.

As described above, in the comparison of the switch configuration according to the above embodiment of the present invention which directly accommodates higher rate port interfaces with the conventional scheme which directly accommodates lower rate port interfaces into the time decision multiplex bus, it is obvious that the former requires a small number of interfaces accommodated in the time division multiplex bus. Hence, occurrence of problems such as shortage of pins can be suppressed in the case of packaging on LSIs to realize an ATM switching system with a large switching capacity.

The output line corresponding queue-in the input buffer module section is prepared by service class. The application of the back pressure originated from the core switch section and the output buffer module section is sub-divided corresponding to service classes to prevent the cell discard. Thus, a variety of service class qualities can be easily proposed regarding the cell discarding rate and delay.

Figure 6:
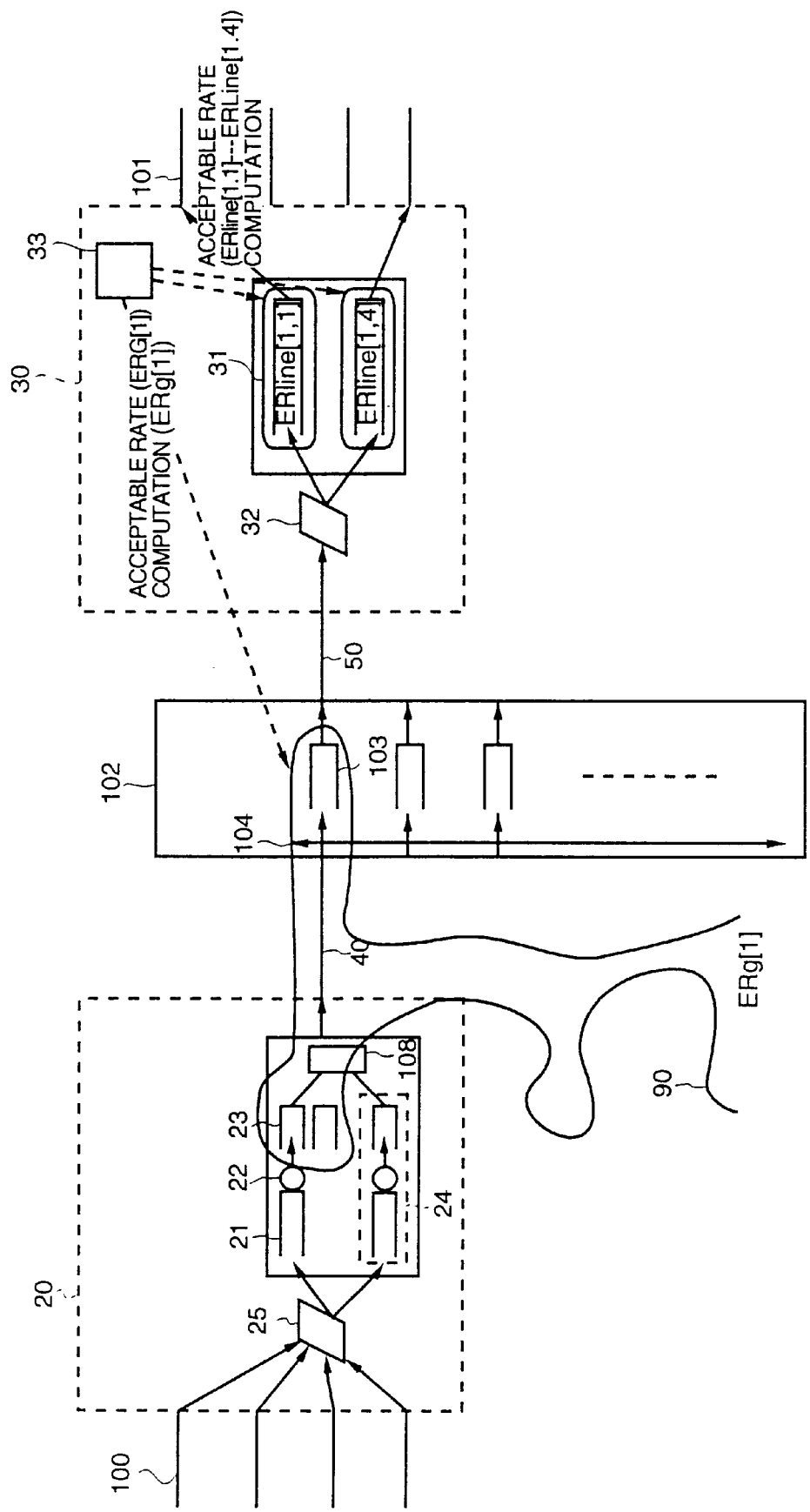
FIG. 6 is a diagram showing an acceptable rate computation environment in the embodiment of FIG. 1.

FIG. 6 illustrates the computing environment of an acceptable rate. For the brief explanation, the configuration is shown in the case where only one service class exists. The acceptable rate computing section 33 installed in each output buffer module section 30 periodically computes a global queue (virtual queue) 90 being a set of parts of the virtual switch internal queues 23 of the output line corresponding queues 24 for the output port accommodated by itself, among output line corresponding queues 24 within all the input buffer module sections 20, as well as an acceptable rate such that a change in time of the queue length of the output line corresponding queue 31 accommodated in the output buffer module section 30 is observed every service classes and the queue length is stabilized in time based on the tendency of the change.

The transmit rate is set to the rate control section 22 in the output line corresponding queue 24 within the input buffer module section 20 every time the acceptable rate computing section 33 computes an acceptable rate. The transmit rate (R[i,j]) set to the rate control section 22 of the output line corresponding queue 24 corresponding to the output line with the line number j accommodated to the output port with the port number i within an input buffer module section 20 is set to the smaller one among the product of an acceptable rate (ERg[i] computed using the global queue 90 of the output port i and the current active VC number (Nvc[i,j] in the output line corresponding queue and the product of an acceptable rate (ERline[i,j] calculated using the output line corresponding queue 31 in the output buffer module section 30 corresponding to the output line j of the output port i and the active VC number (Nvc[i,j] in the output line corresponding queue 24.

R[i,j]=MIN(Erg[i]×Nvc[i,j], ERline[i,j]×Nvc[i,j]).

The active VC number is calculated by referring to the buffer occupancy information for each VC in each output line corresponding queue 24 held by the buffer occupancy computing section 111.

As described above, according to the present embodiment, in the global queue where an input rate congests largely than the output rate, or the output line corresponding queue within the output buffer module-section, an acceptable rate which can provide a large use rate without any congestion is computed. The output line corresponding queue 24 within the input buffer module section 20 has a double configuration of the virtual source queue 21 and the virtual switch internal queue 23. The cell transfer rate from the virtual source queue 21 to the virtual internal queue 23 is controlled based on the acceptable rate calculated by the rear-arranged module in the ATM switching system. Thus, by temporarily storing unclear traffics which does not specify the traffic characteristic being a main factor causing the internal congestion in an ATM switching system, into the virtual queue 21, the flow to the inside of an ATM switching system can be substantially limited. Thus, interference between service classes due to internal congestion can be prevented by suppressing an occurrence frequency of the internal congestion.

In an output line corresponding queue 24 within the input buffer module 20 which can control a cell transfer to all the output line 101, but cannot control for each VC, the product of an acceptable rate calculated in the corresponding destination output line and the active VC number in the output line corresponding queue 24 is set to the rate control section 22. This setting operation is performed in all input buffer module sections 20. Thus, even when the number of virtual channels VCs for the same output line varies between input buffer modules 20, each input buffer module section 20 decides the transmit rate by autonomically considering the VC number for each output line. Hence, uniform throughput can be guaranteed between all VCs for the same output lines.

Figure 7:
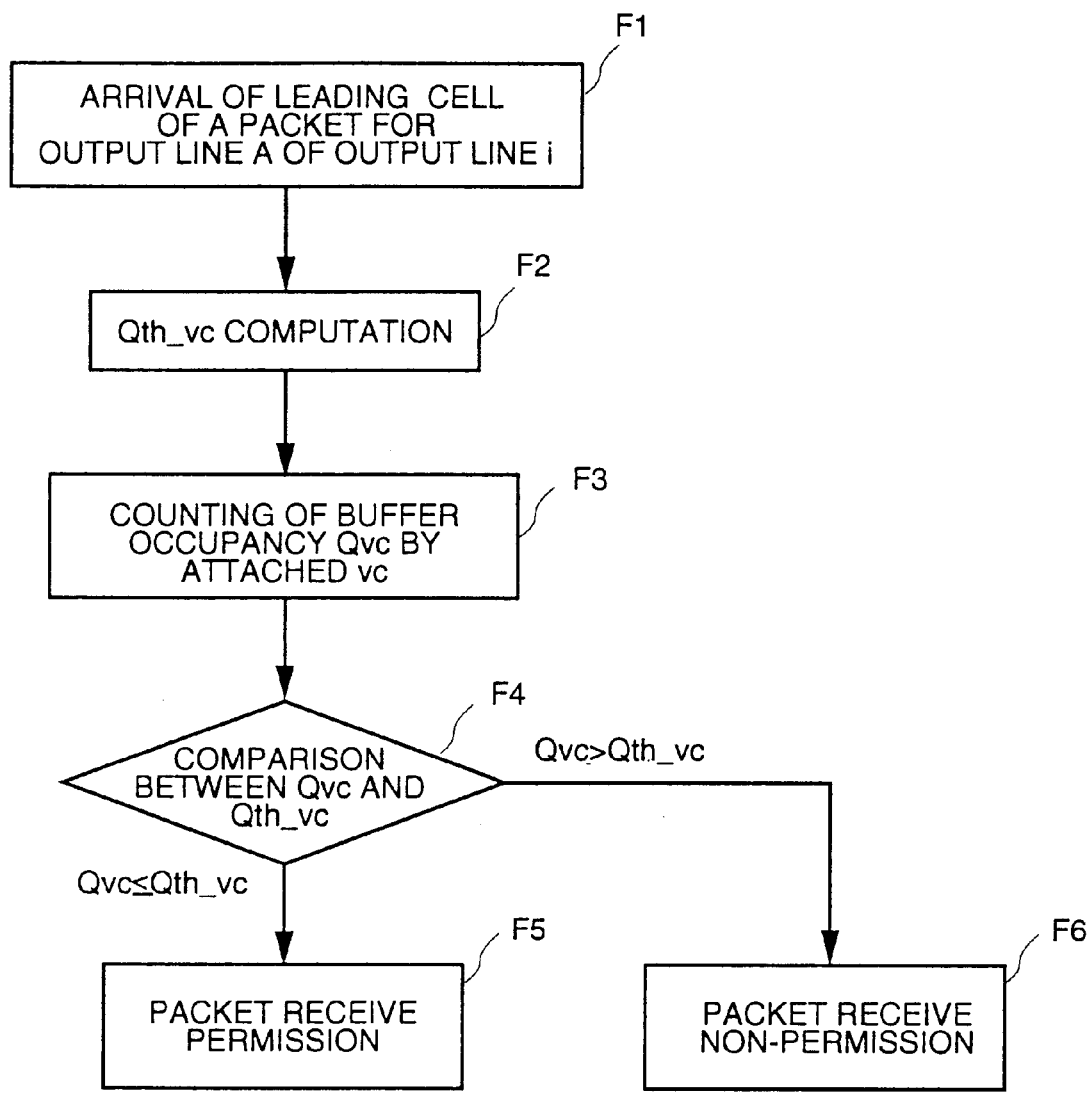
FIG. 7 is a flow chart showing a packet-selection discarding process in the embodiment of FIG. 1.

When the leading head of a packet, as shown with the flowchart in FIG. 7, reaches the output line corresponding queue 24 corresponding to the output line of the line number j accommodated in the output port of the port number i within an input buffer module section 20 (F1), the packet acceptance control section 26 computes the threshold value (Qt_vc) as expressed by the following formula based on the fixed threshold value (Qth) set to all queues and active SC number (Nvc[i,j]) for each output line in the output line corresponding queue 24 (F2):

Qth_vc=(Qth/Nvc[i,j])×K where K is a control parameter to prevent a use rate decline, which can be desirably set by an exchange manager. The occupancy (Qvc) of VC belonging to the packet is compared with Qth_vc (F3,F4). If the Qvc is smaller than Qth_vc (Qvc Qth_vc), the packet is received without any change (F5). On the other hand, if the occupancy of a VC to which the packet belongs is larger than Qth_vc (Qvc>Qth_vc), the packet is discarded (F6).

As described above, according to the present embodiment, whether or not a packet reaching the output line corresponding queue 24 within the input buffer module section 20 is received is decided by comparing the buffer occupancy of the VC to which a packet belongs with the value obtained by dividing a threshold value by an active VC number. Thus, equal throughput can be achieved between plural VCs via the same output line.

Next, concrete cases are illustrated in FIGS. 8 to 21. In the ATM switching system according to the present invention shown in FIGS. 8 to 18, port/line number is ⅔ and four service classes including CBR, VBE, ABR, and UBR can be provided. It is assumed that the threshold value Qth_bpcs at which the core switch queue originates a back pressure signal (BP_CS) to cease CBR class is 80 cells, that the threshold value Qth_bpcs at which the core switch queue originates a back pressure signal (BP_CS) to cease VBR class is 60 cells, that the threshold value Qth_bpcs at which the core switch queue originates a back pressure signal (BP_CS) to cease ABR class is 40 cells, and that the threshold value Qth_bpcs at which the core switch queue originates a back-pressure signal (BP_CS) to cease UBR class is 20 cells. The threshold values Qth_bpoxb at which the output buffer module section originates a BP_OXB signal 80 is 8100 cells. The threshold values Qth_bpoxbl respectively originated from the output line corresponding queues within the output buffer module section are 800, cells by CBR class, 700 cells by VBR class, 600 cells by ABR class, and 500 cells by UBR class, respectively.

Figure 8:
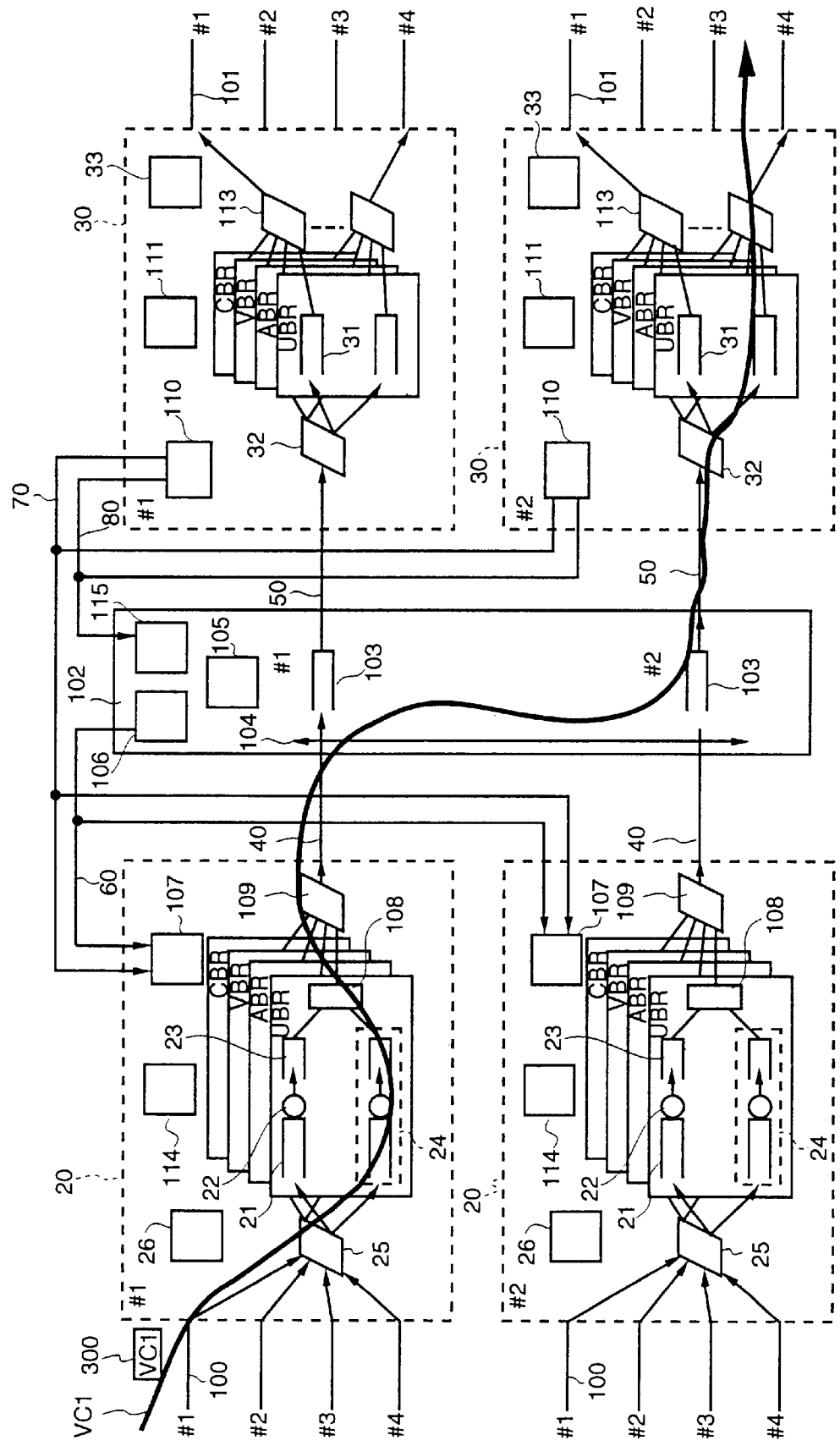
FIG. 8 is a state diagram explaining a process procedure of switching an ATM cell between an input line and an output line in the embodiment of FIG. 1.

In the ATM switching system according to the present invention shown in FIG. 8, the virtual channel VC of UBR class is laid between the input line #1 of the input buffer module section #1 and the output line #4 of the output buffer module #2.

Explanation will be made on the state where the ATM cell 300 belonging to the VC1 of UBR class set between the input line #1 of the input buffer module section #1 and the output line #4 of the output buffer module section #4 is switched between the input line and the output line. FIG. 8 shows the state where the ATM cell #VC1 of the VC1 reaches the input buffer module section #1.

Figure 9:
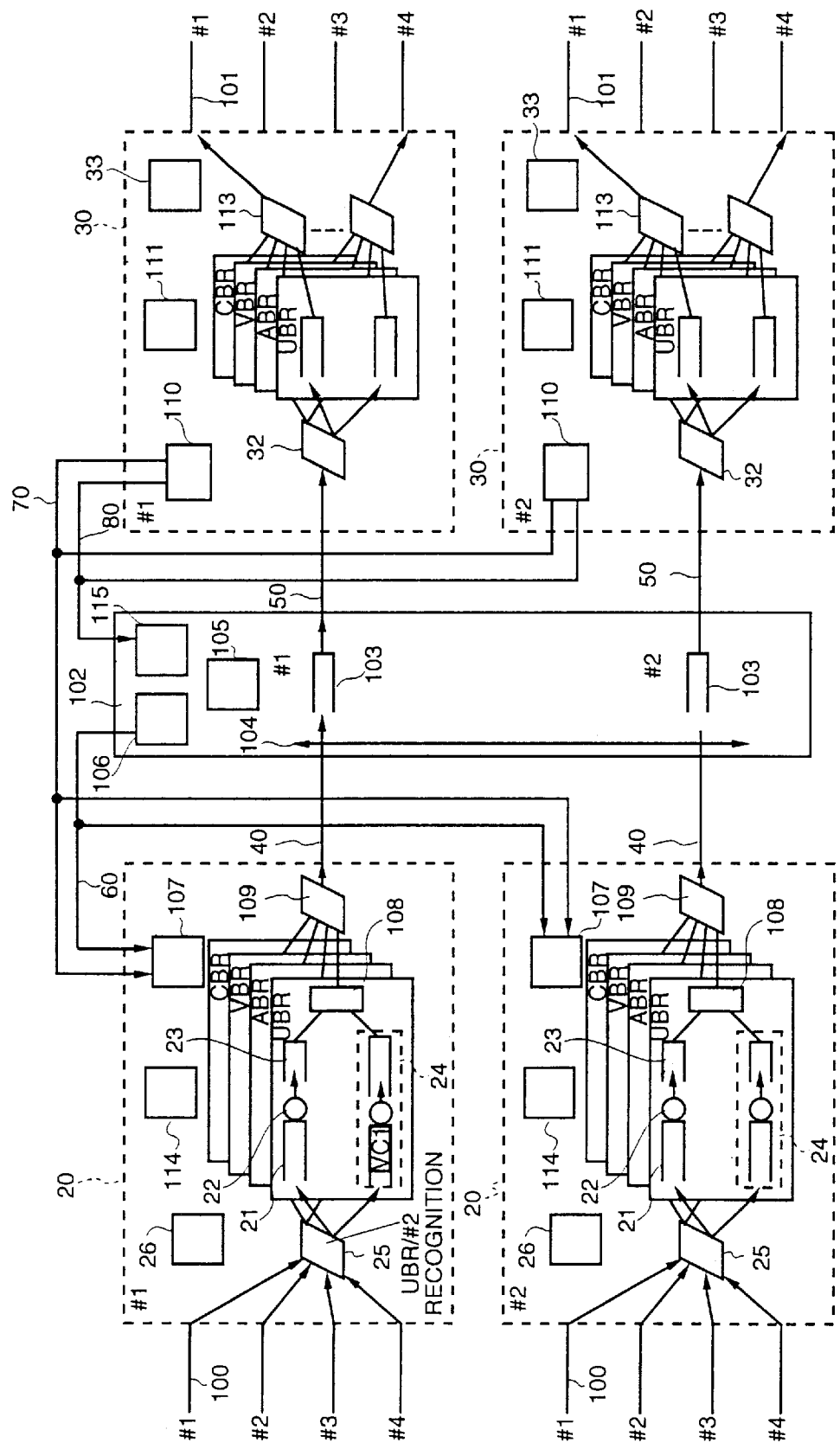
FIG. 9 is a state diagram explaining a process procedure of switching an ATM cell between an input line and an output line in the embodiment of FIG. 1.

First, the class/line separator 25 refers to the connection information of the ATM cell 300, and then recognizes that the destination output line is the output port #2 to output line #4 route and that the service class type is the URB class, and then stores the ATM cell 300 into the virtual source queue of the output line corresponding queue for the output port #2 to output line #4 route for the UBR class (FIG. 9).

Figure 10:
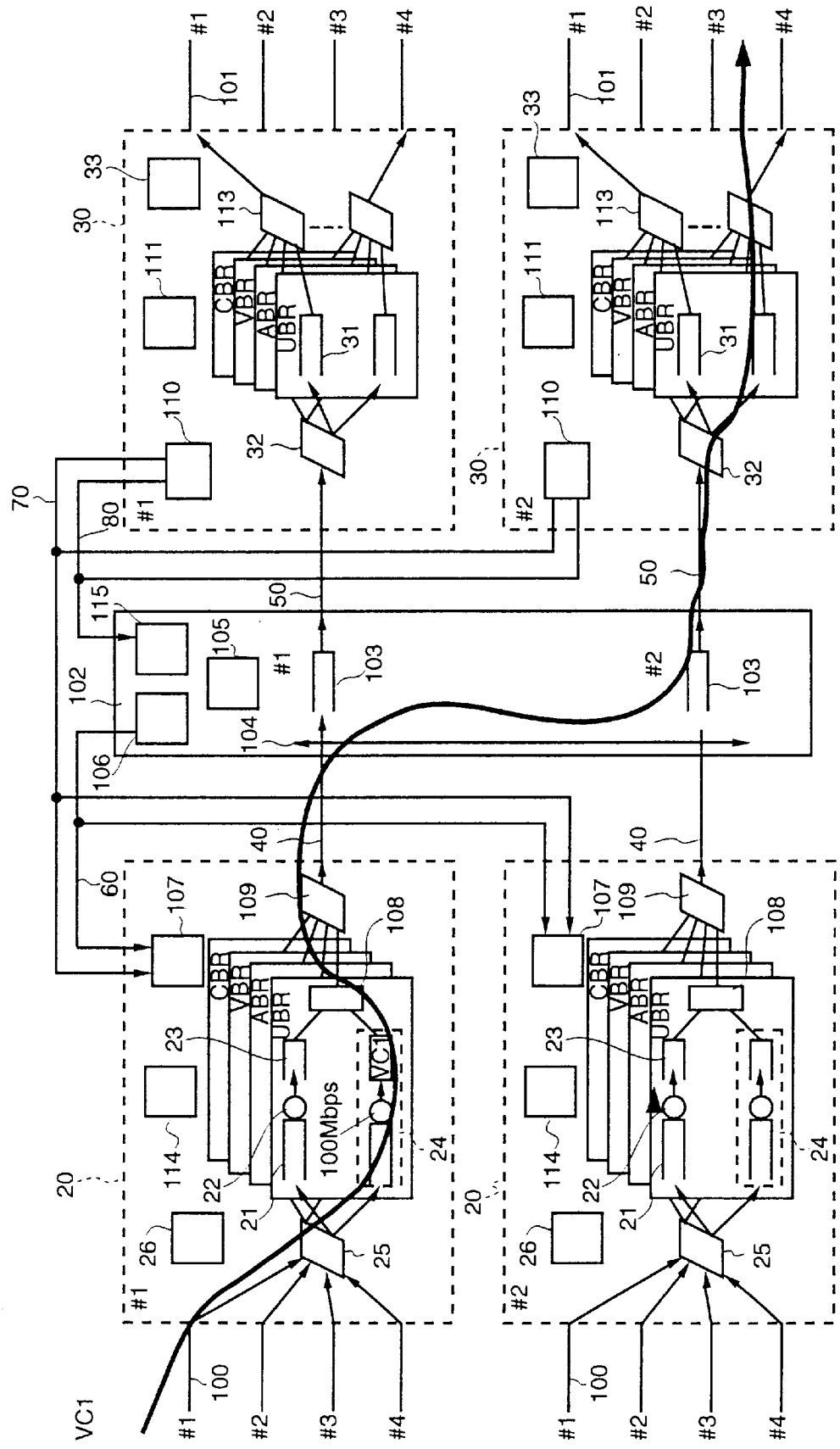
FIG. 10 is a state diagram explaining a process procedure of switching an ATM cell between an input line and an output line in the embodiment of FIG. 1.

Since the transfer rate set in the rate control section 22 is 100 Mbps at present, the cell transfer from the virtual source queue 21 to the virtual switch internal queue 23 is controlled to about 100 Mbps. Thus the ATM cell 300 is transferred to the virtual switch internal queue 23 (FIG. 10).

ATM cells stored earlier than the ATM cell 300 are sequentially sent out of the virtual switch internal queue 23. Soon, the ATM cell 300 gains the head of the virtual switch internal queue 23.

Figure 11:
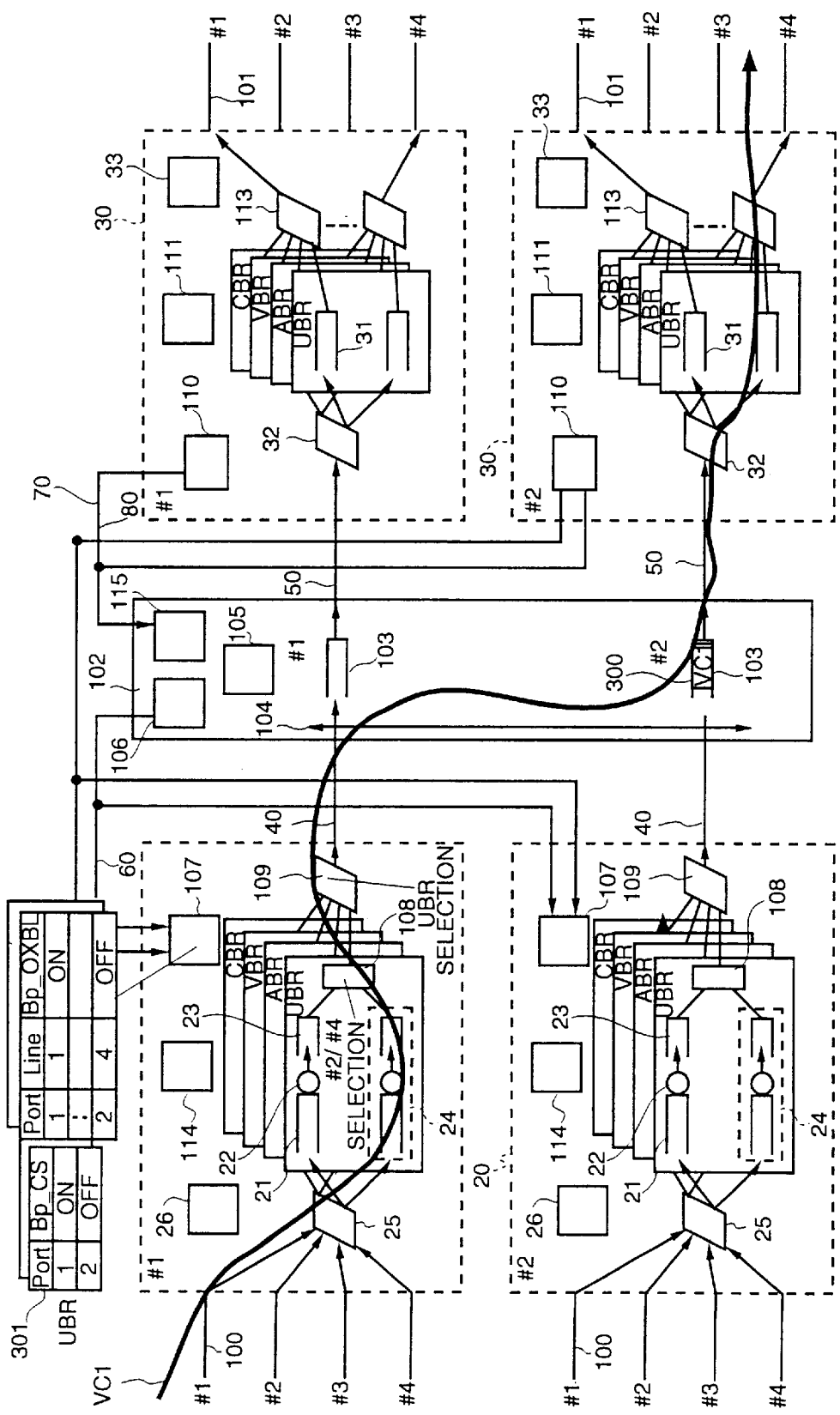
FIG. 11 is a state diagram explaining a process procedure of switching an ATM cell between an input line and an output line in the embodiment of FIG. 1.

Referring to the back pressure receive status 301 held by the back pressure receiving section 107, as shown in FIG. 11, the BP_CS signal and the output applied to the UBR class from the core switch queue 103 of the output port #2 do not receive the BP_OXBL signal 70 from the UBR class output line corresponding queue of the buffer module section #2 (In the back pressure receive status, ON represents in a receive state while OFF represents in a non-receive state). Hence, when the rotation priority control section 108 for the UBR class selects the output line corresponding queue 24 for the output #2 to output line #4 route and when the interclass priority control section 109 selects the UBR class, the ATM cell 300 is taken out of the virtual switch internal queue 23 and then is stored into the core switch queue 103 corresponding to the output port #2 via the time division multiplex bus 104 (FIG. 11).

ATM cells stored earlier than the ATM cell 300 are sequentially sent out of the core switch queue 103. Soon, the ATM cell 300 gains the head of the core switch queue 103. Referring to the back pressure receive status 301 <held by the back pressure receiving section 107, the BP_OXB signal 80 from the output buffer module section #2 of the output port #2 is not in a receive state. Hence, the ATM cell 300 is transmitted from the core switch queue 103 to the output port 50 and then is transmitted to the successive output buffer module section #2.

Figure 12:
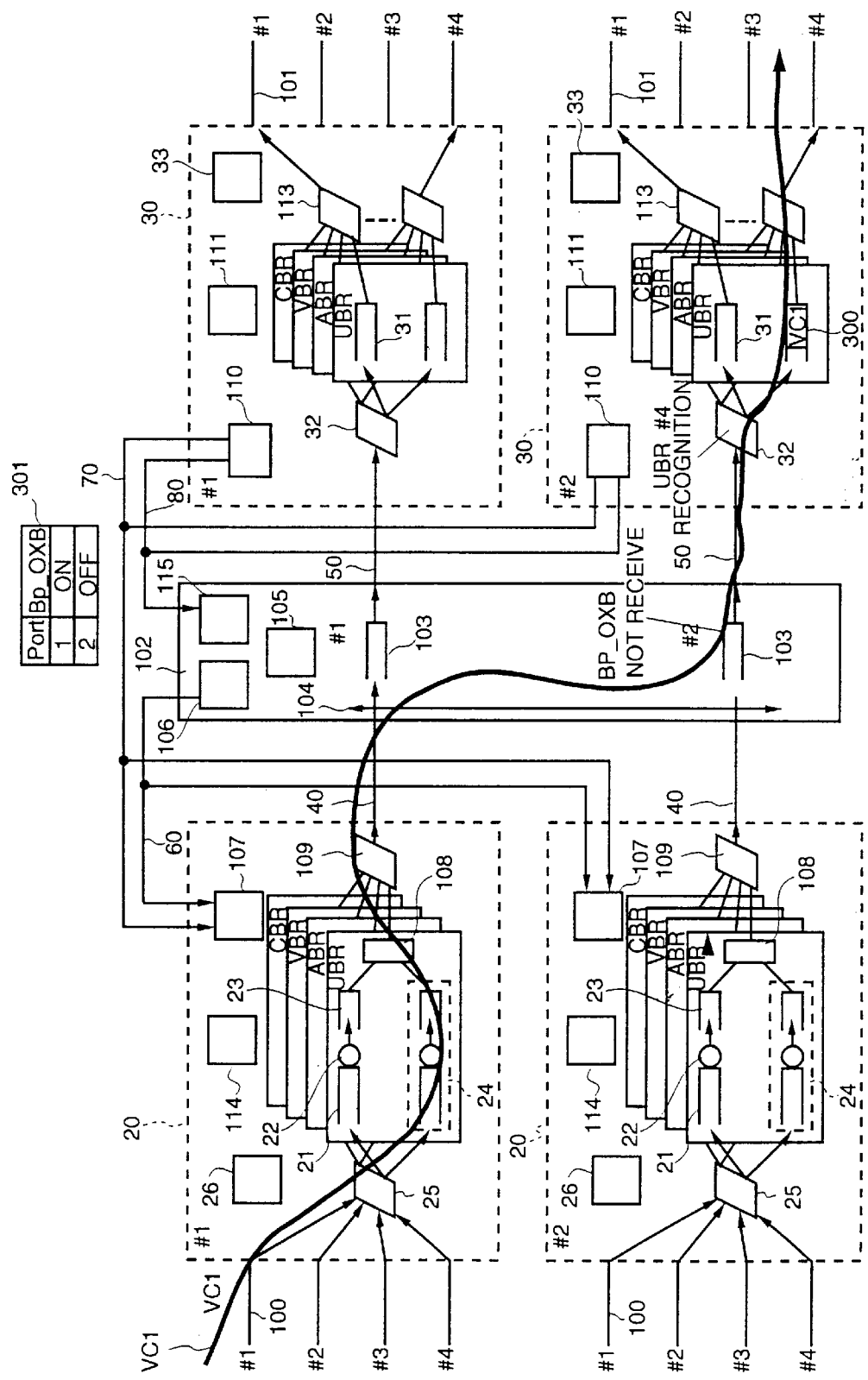
FIG. 12 is a state diagram explaining a process procedure of switching an ATM cell between an input line and an output line in the embodiment of FIG. 1.
Figure 13:
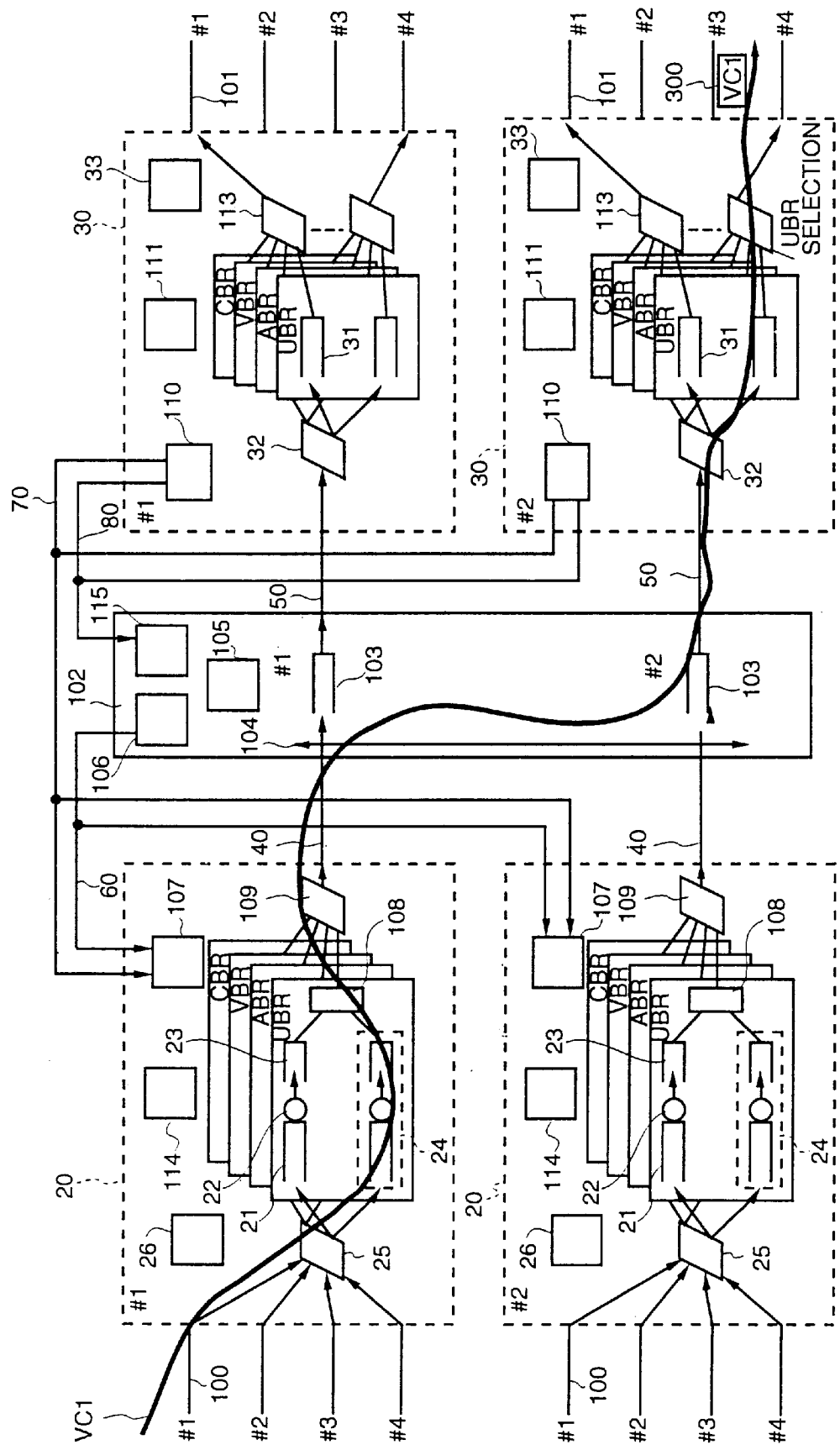
FIG. 13 is a state diagram explaining a process procedure of switching an ATM cell between an input line and an output line in the embodiment of FIG. 1.

In the output buffer module section #2, the class/line separator 32 refers to the connection information of the ATM cell 300 and then recognizes that the destination output line is the output line #4 and that the service class type is the UBR class. Then the ATM cell 300 is stored into the output line corresponding queue addressed to the output line #4 for the UBR class (FIG. 12). ATM cells stored earlier than the ATM cell 300 are sequentially sent out of the output line corresponding queue. Then the ATM cell 300 reaches the head of the output line corresponding queue. When the interclass priority control section 109 for the output line #4 selects the UBR class, the leading cell is sent to the output line 101 (FIG. 13).

Figure 14:
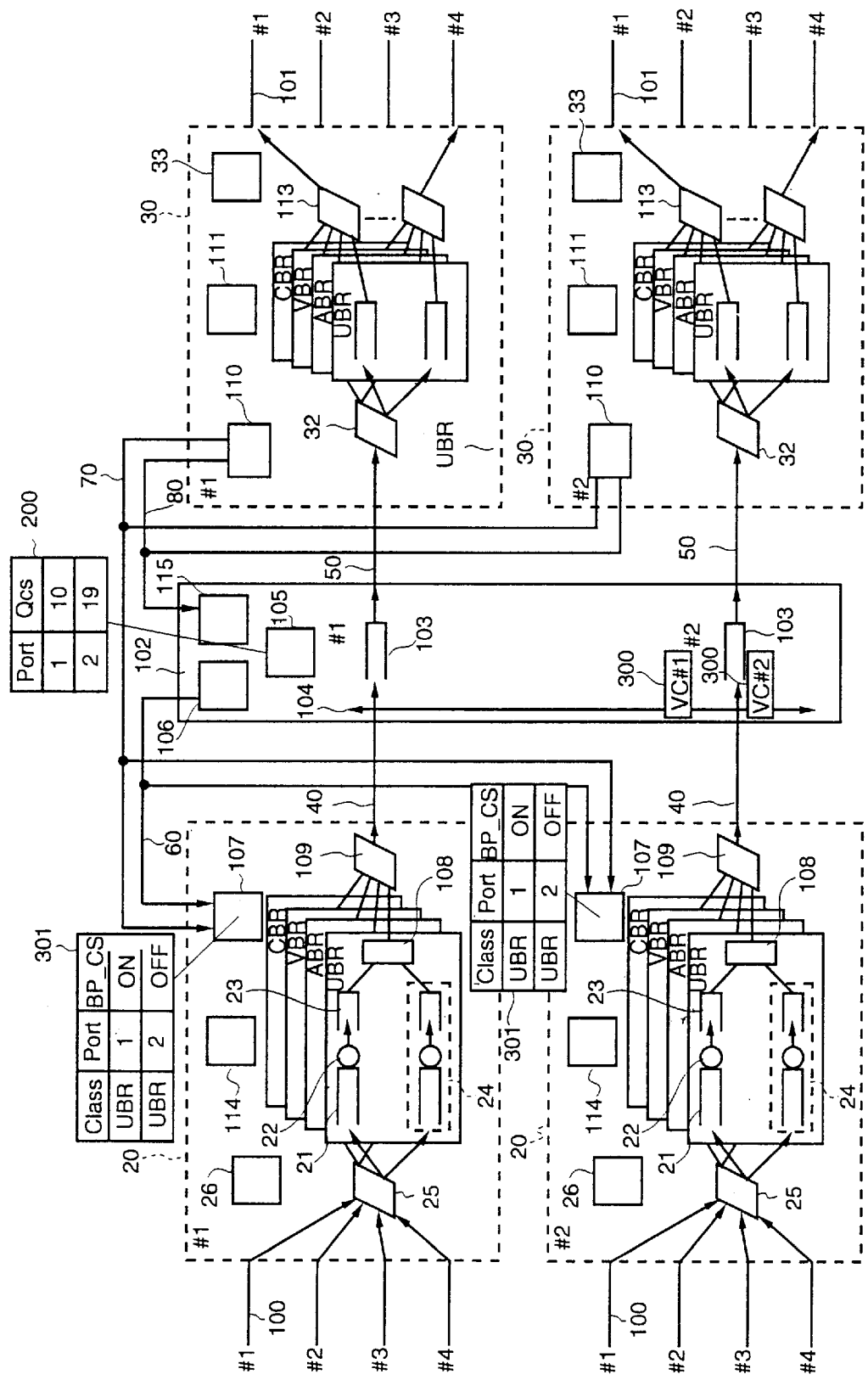
FIG. 14 is a state diagram explaining a process procedure of processing plural ATM cells arrived simultaneously when the core switch queue length is less than BP_CS signal generation threshold value, in the embodiment of FIG. 1.

FIG. 14 shows the status where when the core switch queue length Qcs of the port #2 is less than the threshold value Qth_bpcs (=20 cells) originating the BP_CS signal 60 to stop the UBR class, plural ATM cells reach at the same time to the core switch queue 103.

Figure 15:
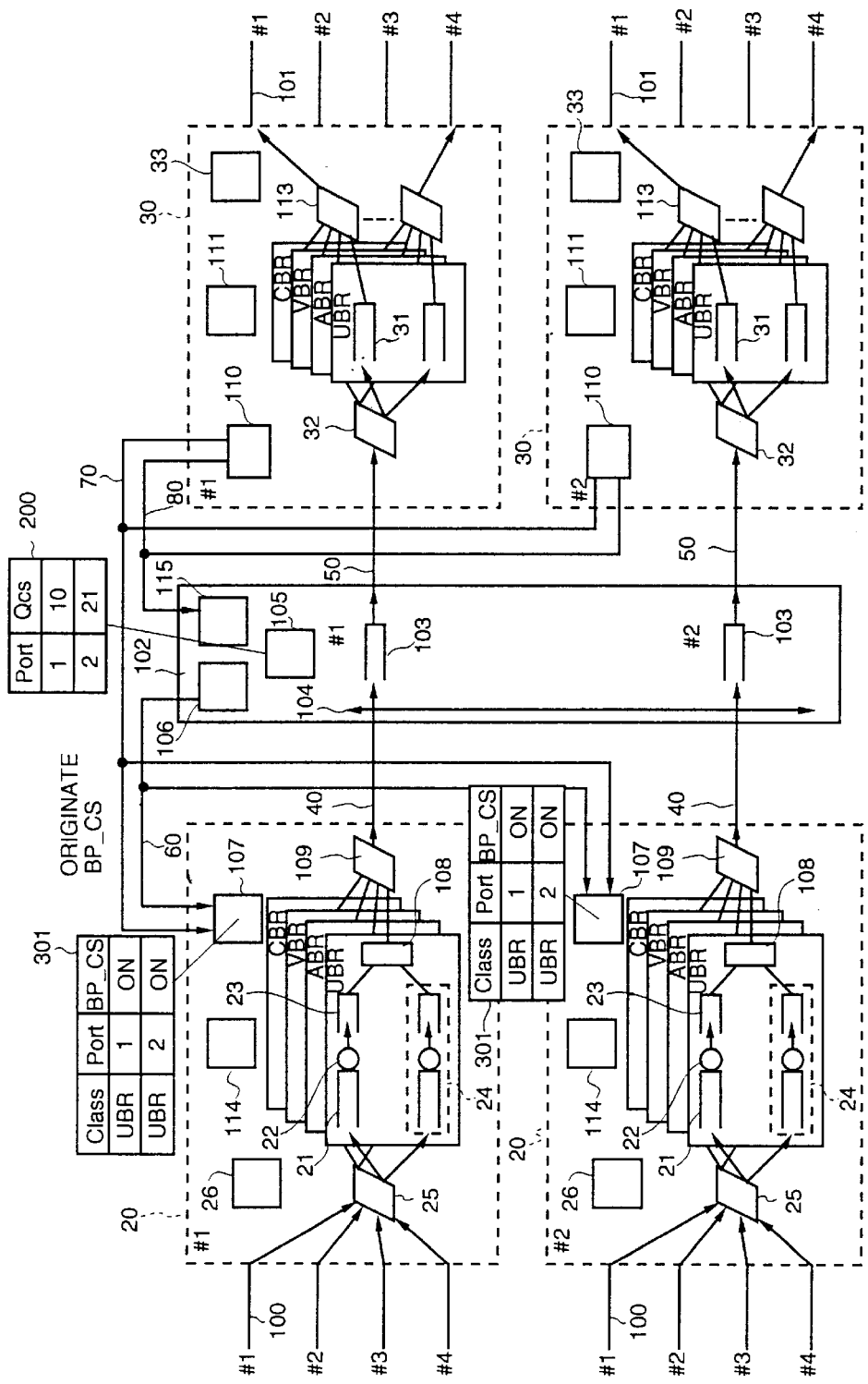
FIG. 15 is a state diagram explaining a process procedure of processing plural ATM cells arrived simultaneously when the core switch queue length is less than BP_CS signal generation threshold value, in the embodiment of FIG. 1.

Since the core switch queue length Qcs exceeds the threshold Qth_bpcs because of the storage of the ATM cells, the core switch queue 103 of the port #2 originates the BP_CS signal 60 ceasing the UBR class cell for the port to all the input buffer module sections 20. The input buffer module section 20 stops transmitting the UBR class cell to the port #2 in response to the BP_CS signal 60 (FIG. 15).

Similarly, when the core switch queue length Qcs exceeds each service class corresponding threshold Qth_bpcs, the BP_CS signal 60 is originated to all input buffer module sections 20 to stop performing the cell transmission in the corresponding service class for the core switch queue.

BP_CS signals respectively applied for service classes are prepared in the present embodiment. However, it is possible to configure so as to apply plural service classes to one BP_CS signal.

Figure 16:
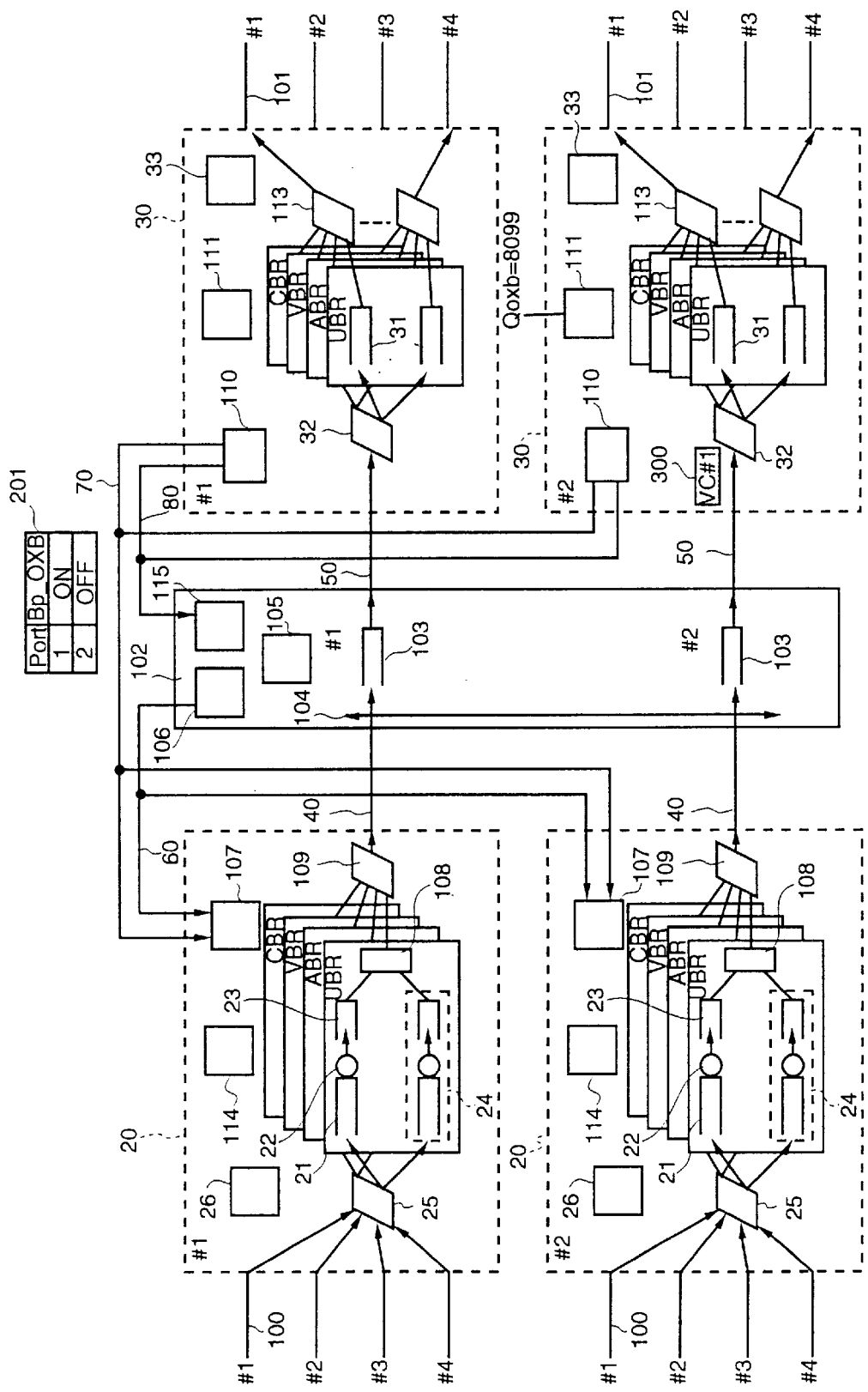
FIG. 16 is a state diagram explaining a process procedure of processing an ATM cell arrived when the buffer occupancy of an output buffer module section is less than a threshold value for BP_OXB signal generation, in the embodiment of FIG. 1.
Figure 17:
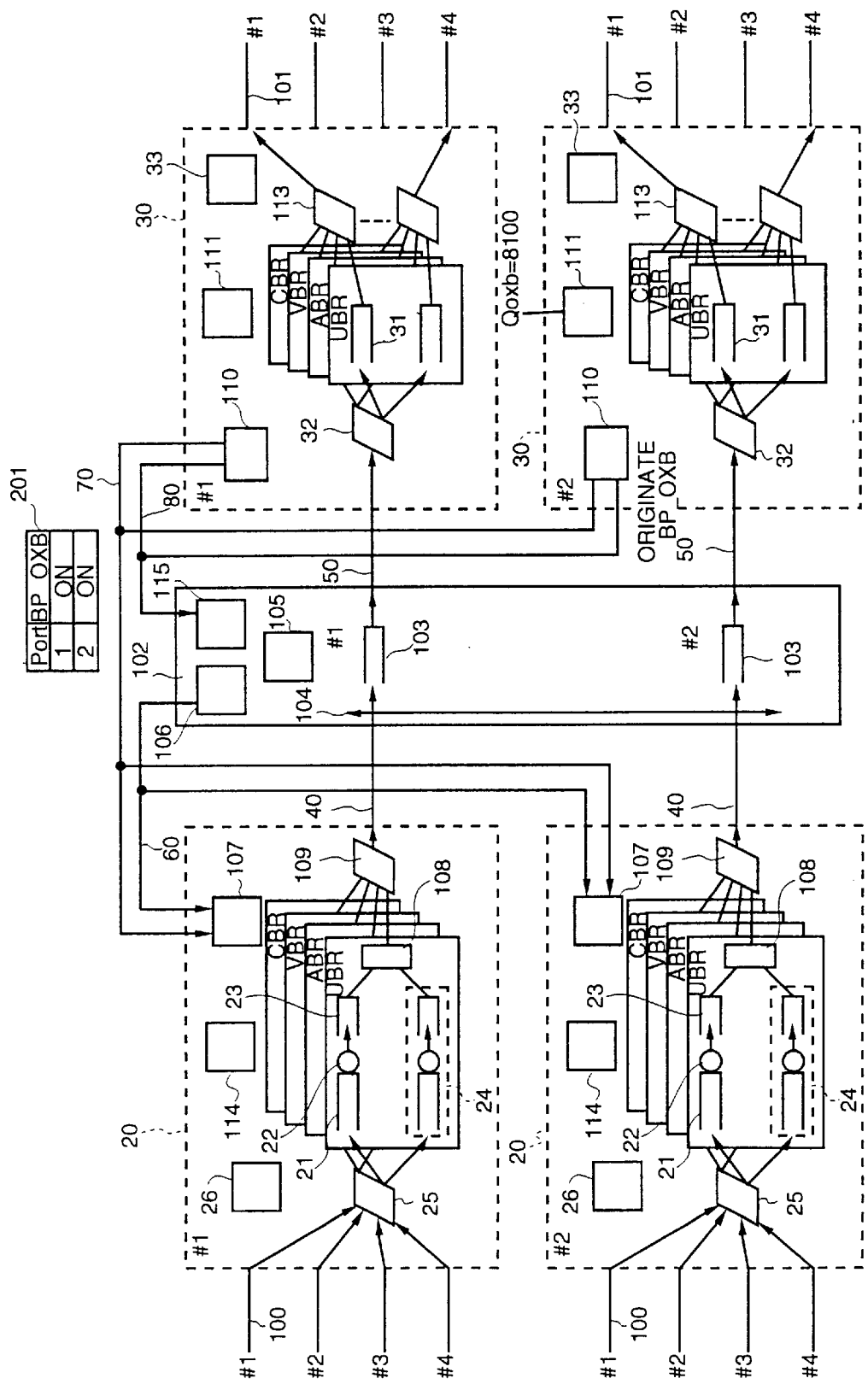
FIG. 17 is a state diagram explaining a process procedure of processing an ATM cell arrived when the buffer occupancy of an output buffer module section is less than a threshold value for BP_OXB signal generation, in the embodiment of FIG. 1.

FIG. 16 shows the status where an ATM cell reaches when the buffer occupancy Qoxb of the output buffer module section #2 is 8090 cells. Because of a storage of the ATM cell, the core switch queue length Qcs exceeds the threshold Qth_bpoxb (=8100 cells) originating the BP_OXB signal. Hence the output buffer module section #2 originates the BP_OXB signal to the core switch queue 103 arranged just in front of the output buffer module section #2. The core switch queue 103 stops all cell transmission in response to the BP_OXB signal (FIG. 17).

Figure 18:
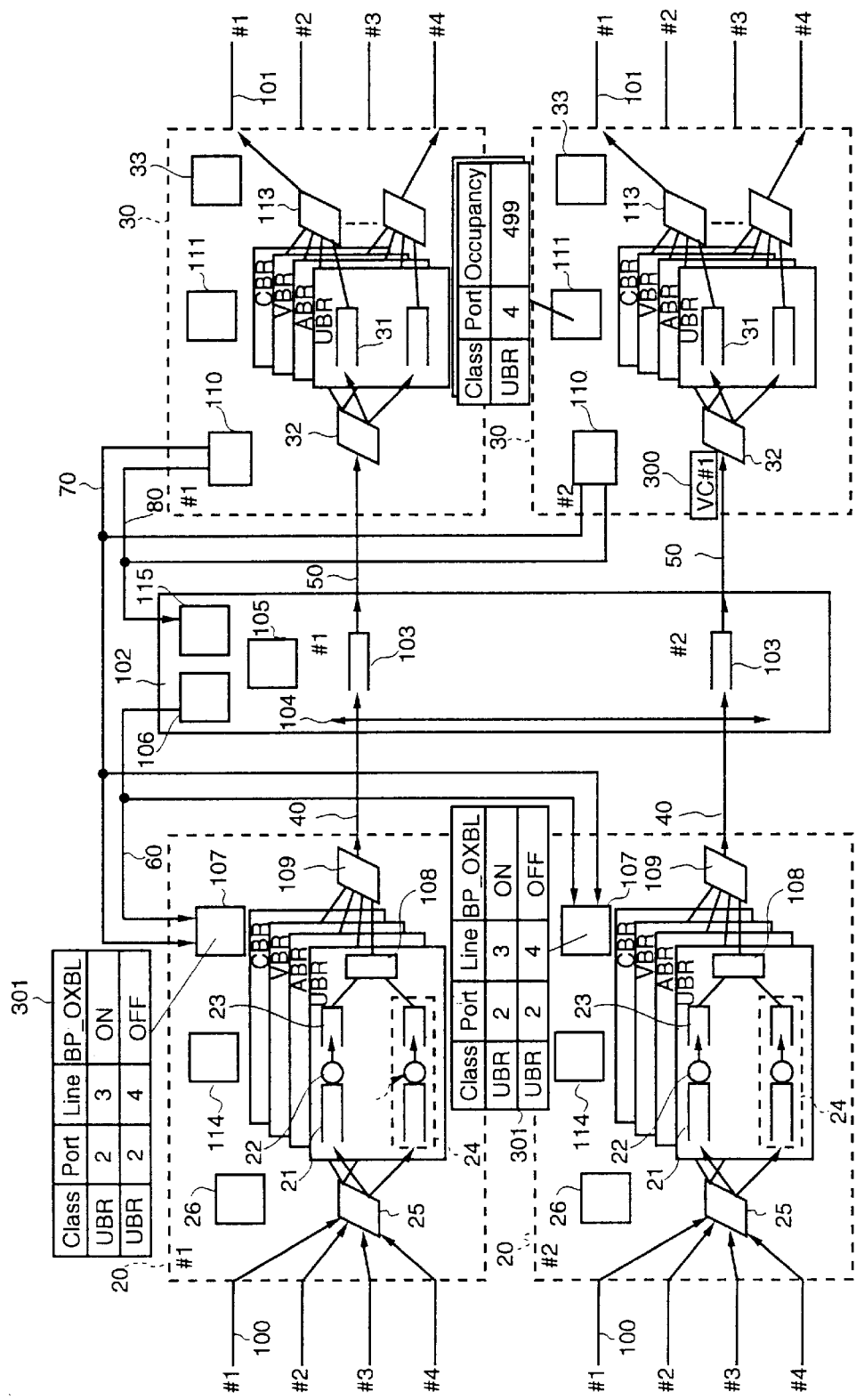
FIG. 18 is a state diagram explaining a process procedure of processing an ATM cell arrived when the output line corresponding queue in an output buffer module section is less than a threshold value for BP_OXBL signal generation, in the embodiment of FIG. 1.
Figure 19:
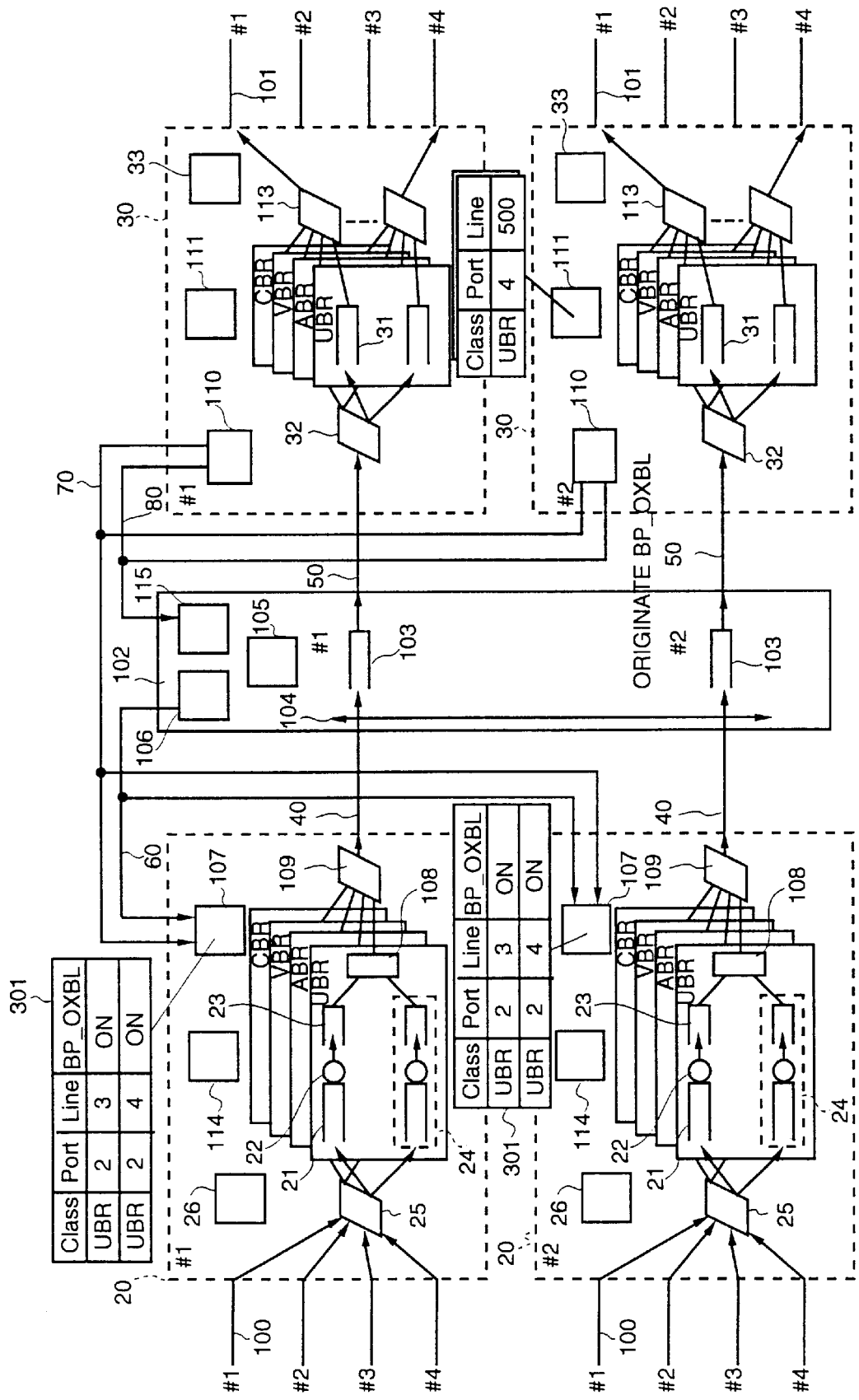
FIG. 19 is a state diagram explaining a process procedure of processing an ATM cell arrived when the output line corresponding queue in an output buffer module section is less than a threshold value for BP_OXBL signal generation, in the embodiment of FIG. 1.

FIG. 18 shows the status where an ATM cell reaches when the buffer occupancy Qoxbl for UBR class queue corresponding to the input line #4 within the output buffer module section #2 is 499 cells when the ATM cell is stored, the buffer occupancy Qoxbl exceeds the threshold value Qth_bpoxbl (=50 cells) for originating the BP_OXBL signal 70. Hence the output buffer module section #2 originates the BP-OXBL signal 70 to all the input buffer module sections 20. The input buffer module section 20 stops transmitting the UBR class cell for the output port #2 to output port #4 route in response to the BP_OXBL signal 70 (FIG. 19).

Figure 20:
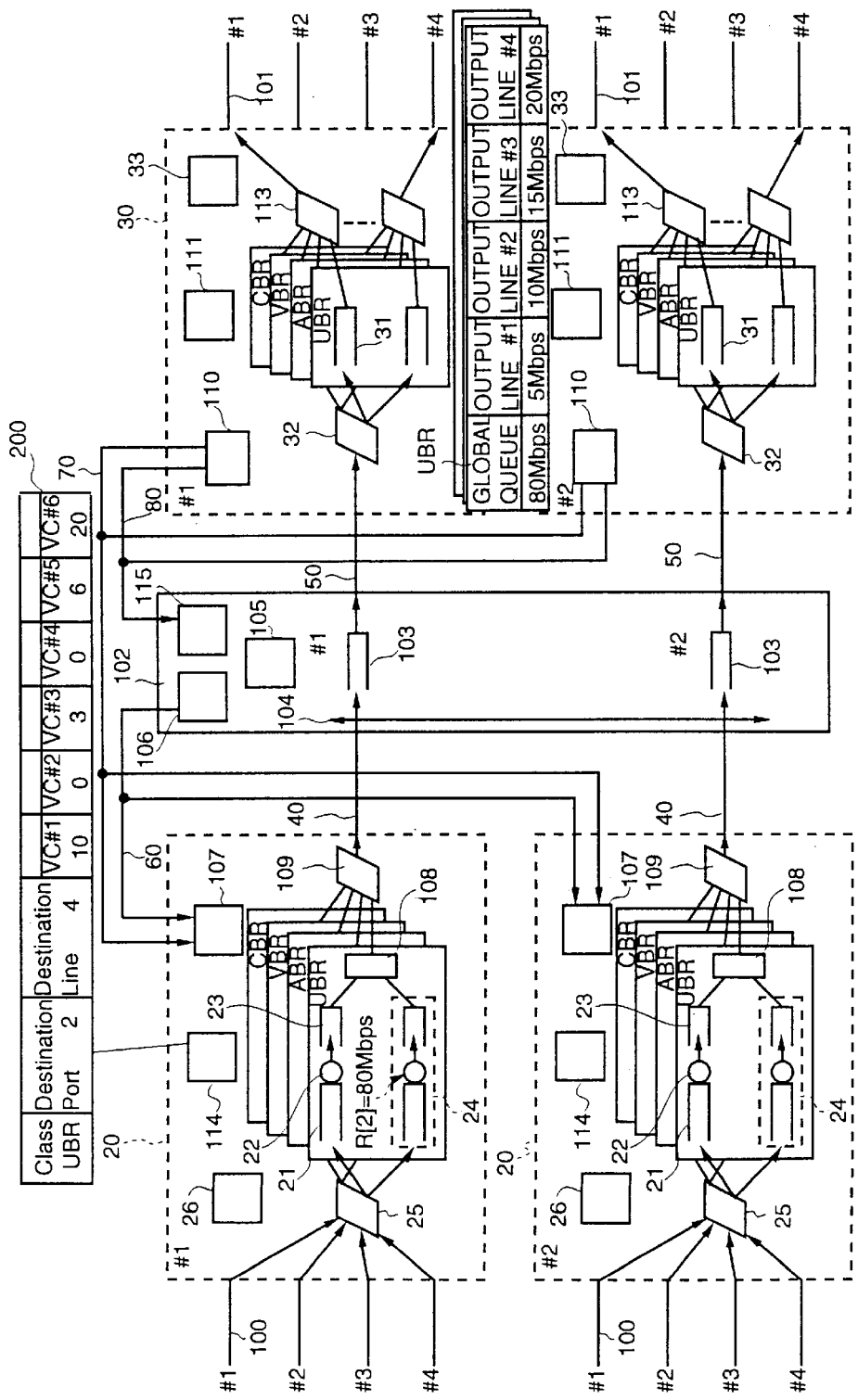
FIG. 20 is a state diagram explaining a process procedure of setting an acceptable rate to the rate control section within an input buffer module section, in the embodiment of FIG. 1.

Referring to FIG. 20, the transfer rate R[2,4] is set to the rate control section 22 of the output line corresponding queue 24 of a service class corresponding to the output line #4 of the output port #2 within the input buffer module #1. The acceptable rate computing section 33 periodically computes an acceptable rate in each queue. The rate is set to the rate control section 22 every computation execution.

In the latest rate computing process, the acceptable rate ERg[2] in the global queue 90 of the port #2 is 80 Mbps. The acceptable rate ERline[2,4] in the output line corresponding queue corresponding to the output line #4 accommodated in the output buffer module #2 is 20 Ybps.

At this time, the total active VC number Nvc[2,4] in the output line corresponding queue corresponding to the output port #2 of the input buffer module #1 is 4. The rate R[2,4] setting the output line corresponding queue is as follows:

R[2,4]=MIN(Erg[2]×Nvc[2,4], ERline [2,4]×Nvc[2,4])

R[2,4]=MIN(80 Mbps×4, 20 Mbps×4)

R[2,4]=MIN(320 Mbps, 80 Mbps)

R[2,4]=80 Mbps

80 Mbps is set to the rate control section 22 of the output line corresponding queue 24 corresponding to the output port #2 to output line #4 route of the input buffer module section #1. This rate setting process is performed using the acceptable rate for the service class for each service class.

Figure 21:
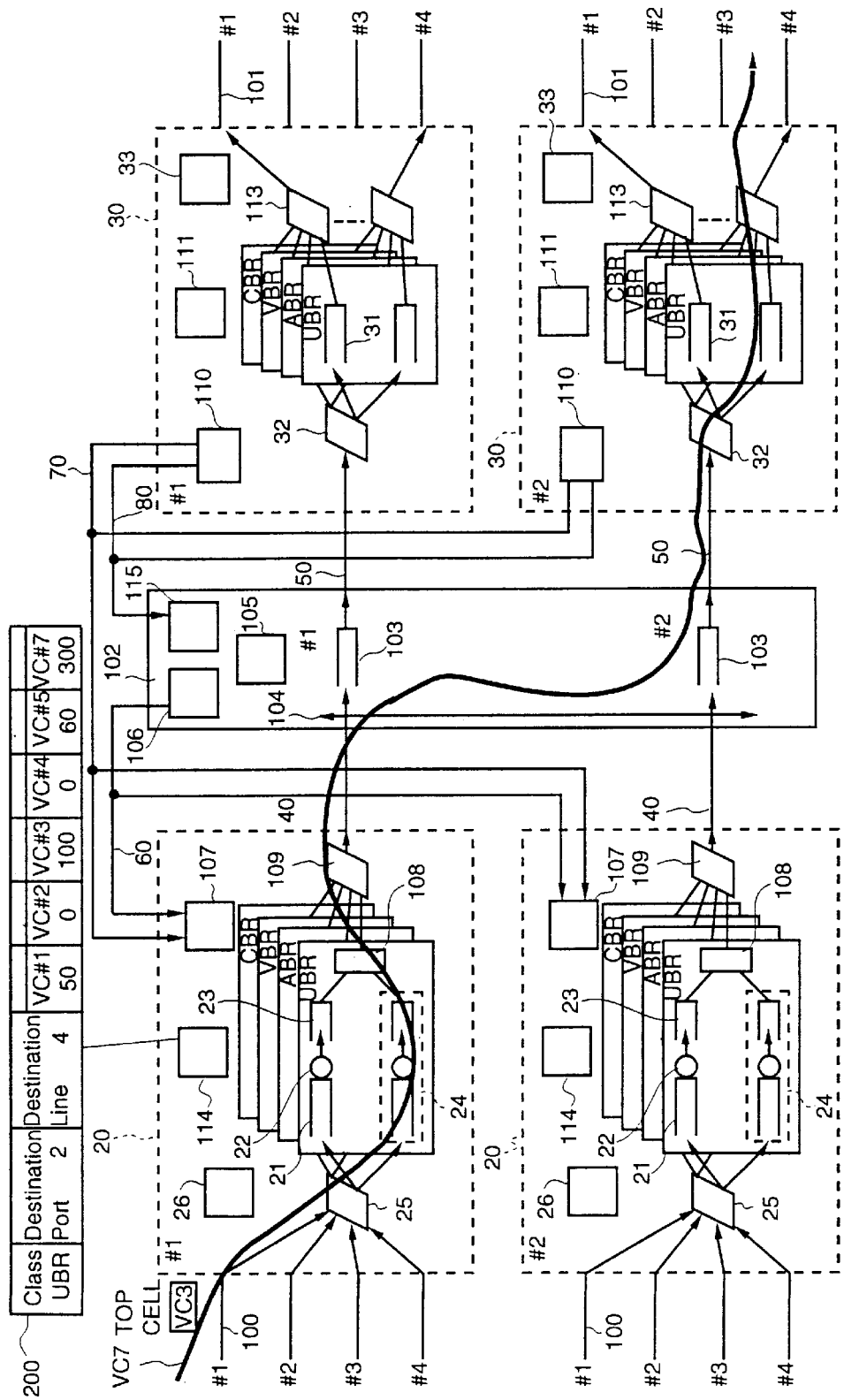
FIG. 21 is a state diagram explaining a process procedure of judging whether or not a packet can be received when the leading cell of a packet arrives at an input buffer module section, in the embodiment of FIG. 1.

Referring to FIG. 21, the virtual channel VC 7 of the UBR class is laid between the input line #1 of the input buffer module section #1 and the output line #4 of the output back module section #2 in the ATM switching system of the present invention. FIG. 21 shows the status where the leading cell of a packet belonging to the VC 7 has reached. It is assumed that the fixed threshold value Qth is 500 cells.

Referring to FIG. 21, the active VC number Nvc[2,4] in the output line corresponding queue corresponding to the output port #2 to output line #4 route in the input buffer module section #1 is 4. The relation between the buffer occupancy of each VC and the threshold value Qth_vc to be compared is as follows:

Qth_vc=(Qth/Nvc[2,4]×K)

Qth_vc=(500 cell/4)×1.0

Qth_vc=125 cell

Here, 1.0 is used as the control parameter K which can be arbitrarily set by an exchange manager. Since the buffer occupancy by VC7 is 300 cells and exceeds the threshold value Qth_vc, it is decided to discard a packet having the cell as the leading cell. The packet acceptance control section 26 controls so as to discard all cells of the VC7 before the leading cell and the final cell of the packet come. If the buffer occupancy of the VC is smaller than the threshold value, it is decided to receive the packet having the cell as the leading cell.

As described above, it should be noted that the embodiments disclosed in detail in the specification and drawings do not restrict the scope of the present invention. Various modifications may be achieved without departing from the subject matter of the present invention and the attached claims.

As described above, in comparison with a conventional scheme directly accommodating a low rate rotation interface to a time-division multiplex bus, it is clear that the switch configuration according to the present invention directly accommodating a high rate port interface requires a smaller number of interfaces to realize an ATM exchange holding a large switching capacity. As a result, the trouble such as a shortage of the number of pins can be prevented upon packaging LSIs.

Various service class qualities can be easily maintained as to the cell discarding rate and delay by preparing a output line corresponding queue for each service class in the input buffer module section and sub-divisionally applying the back pressure originated from the core switch section or the output buffer module section by service class.

Furthermore, an acceptable rate which can provide a large use rate with no occurrence of congestion is computed in the global queue being a congestion generating spot in which its input rate is larger than the output rate and the output line corresponding queue within the output buffer module section. The output line corresponding queue within the input buffer module section has a double structure including a virtual source queue and a virtual switch internal queue. The cell transfer rate from the virtual source queue to the virtual switch is controlled based on the acceptable rate computed by the rear module in the ATM switching system. Thus, the unclear input traffic which does not specify the traffic characteristic being a major factor inducing an internal congestion in the ATM switching system are temporarily stored into the virtual source queue and then are substantially limited to flow the input traffic into the ATM switching system. As a result, the frequency of internal congestion occurrence can be suppressed, so that the interference between service classes due to the internal congestion can be removed.

Moreover, in the output line corresponding queue within the input buffer module section which can control the cell transfer to all the output lines but cannot control the cell transfer for each VC, the product of an acceptable rate computed using an output line corresponding queue within the output buffer module section and an active VC number in the output line corresponding queue can be set to the rate control section. This setting operation is performed to all the input buffer modules. Thus, even when the number of VCs for the same output line varies between input buffer module sections, the input buffer module section 20 decides the transmit rate by autonomically considering the number of VCs for each output line, so that an equal throughput can be guaranteed between VCs for the same output line.

Furthermore, whether or not the packet reaching the output line corresponding queue within the input buffer module section 20 is received is decided by comparing the buffer occupancy by the VC to which a packet belong with the result obtained by dividing a fixed threshold value by the number of active VCs. Thus, equal throughput can be achieved between plural VCs via the same output line.

The entire disclosure of Japanese Patent Application No. 8-279763 filed on Oct. 23, 1996 including specification, claims, drawing and summary are incorporated herein by reference in its entirety.

What is claimed is:

1. An ATM switching system comprising:
   a switch section for storing an ATM cell into a buffer to implement an ATM cell exchange between an input port and an output port at a predetermined transmission rate;
   an input buffer module section having a buffer that multiplexes plural input/output lines with a transmission rate slower than said predetermined transmission rate to the input port of said switch section and then stores said ATM cell; and
   a buffer module section for separating an output from the output port of said switch section into plural output lines with a transmission rate slower than said predetermined transmission rate and then storing said ATM cell;
   said input buffer module section which enables queuing from said ATM cell to said buffer for each of the output lines and for each service class accommodated by said input buffer module section itself;
   said output buffer module section which enables queuing to said buffer for each destination output line and for each service class;
   said output buffer module section including:
      means for originating a cell inhibit signal to said switch section when the total occupancy of said buffer exceeds a predetermined threshold value;
      queues respectively placed for said output lines; and
      means for originating a cell inhibit signal to all said input buffer module sections when the length of each of said queues exceeds a predetermined threshold value;
   said switch section including:
      queues respectively placed for said output ports;
      means for originating a cell inhibit signal to all, said input buffer module section when each of said queues exceeds a predetermined threshold value; and
      halt control means for halting a cell transmission to said output buffer module section to which said cell inhibit signal has originated;
   said input buffer module section including:
      halt control means for halting a cell transmission to said output port and said output line to which said cell inhibit signal is originated.

2. The ATM switching system of claim 1, wherein said input buffer module section further comprises an output line corresponding queues respectively placed for said output lines, and a virtual queue being a set of queues for the same output port among said queues; and wherein said output buffer module section further comprises rate computing means for periodically computing an acceptable rate of a queue for each of said output lines in said output buffer module section.

3. The ATM switching system of claim 2, wherein said rate computing means periodically computes an acceptable rate for each service class based on a status time change of said virtual queue by service class or said output line corresponding queue of said output buffer module section, and wherein said input buffer module section further includes an internal rate control means that controls a cell transmission for each output line based on said acceptable rate.

4. The ATM switching system of claim 3, wherein said output line corresponding queue has a double structure including a first queue and a second queue in said input buffer module section, and wherein said internal rate control means is placed between said first queue and said second queue to control cell transfer from said first queue based on said virtual queue or an acceptable rate computed by means of said rate computing means in said output buffer module section.

5. The ATM switching system of claim 4, wherein among a product of an acceptance rate computed using said virtual queue for an output port corresponding to said output line corresponding queue and the number of active logical channels in which a cell is stored into an output line corresponding queue in said output buffer module section corresponding to said output line corresponding queue at a current time and a product of an acceptable rate computed using an output line corresponding queue in said output buffer module section corresponding to said output line corresponding queue and the number of active logical channels in said output line corresponding queue, a smaller product is used as a transfer rate to be set to said internal rate control means in said output line corresponding queue within said input buffer module section.

6. The ATM switching system of claim 1 wherein the buffer occupancy of an output line corresponding queue of said input buffer module section is observed for each logical channel, and wherein a packet is discarded when a buffer occupancy of the logical channel of said packet in said output line corresponding queue exceeds a predetermined threshold value upon arrival of the leading cell of said packet to said output line corresponding queue.

7. The ATM switching system of claim 6, wherein a value obtained by dividing a fixed threshold value by the number of active logical channels of said output line corresponding queue is used as a value compared with a buffer occupancy of the logical channel of said packet in said output line corresponding queue of said input buffer module section.

8. An ATM switching system comprising:
   a switch section for storing an ATM cell into a buffer to implement an ATM cell exchange between an input port and an output port at a predetermined transmission rate;
   an input buffer module section having a buffer that multiplexes plural input/output lines with a transmission rate slower than said predetermined transmission rate to the input port of said switch section and then stores said ATM cell; and
   a buffer module section for separating an output from the output port of said switch section into plural output lines with a transmission rate slower than said predetermined transmission rate and then storing said ATM cell;
   said input buffer module section which enables queuing from said ATM cell to said buffer for each of the output lines and for each service class accommodated by said input buffer module section itself;
   said output buffer module section which can queue said ATM cell to said buffer for each destination output line and for each service class;
   said output buffer module section including:
      means for originating a cell inhibit signal to said switch section when the total occupancy of said buffer exceeds a predetermined threshold value;
      queues respectively placed for said output lines;
      means for originating a cell inhibit signal to all said input buffer module sections when the length of each of said queues exceeds a predetermined threshold value; and
      rate computing means for periodically computing an acceptable rate for each service class based on a status time change of said virtual queue by service class or said output line corresponding queue of said output buffer module section;
   said switch section including:
      queues respectively placed for said output ports;
      means for originating a cell inhibit signal to all said input buffer module section when each of said queues exceeds a predetermined threshold value; and
      halt control means for halting a cell transmission to said output buffer module section to which said cell inhibit signal has originated;
   said input buffer module section including:
      halt control means for halting a cell transmission to an output port and said output line to which said cell inhibit signal is originated;
      an output line corresponding queues respectively placed for said output lines;
      a virtual queue being a set of queues for the same output port among said queues; and
      an internal rate control means that controls a cell transmission for each output line based on said acceptable rate computed by said rate computing means;
   wherein among a product of an acceptance rate computed using said virtual queue for an output port corresponding to said output line corresponding queue and the number of active logical channels in which a cell is stored into an output line corresponding queue in said output buffer module section corresponding to said output line corresponding queue at a current time and a product of an acceptable rate computed using an output line corresponding queue in said output buffer module section corresponding to said output line corresponding queue and the number of active logical channels in said output line corresponding queue, a smaller product is used as a transfer rate to be set to said internal rate control means;
   wherein said output line corresponding queue has a double structure including a first queue and a second queue in said input buffer module section, and wherein said internal rate control means is placed between said first queue and said second queue to control cell transfer from said first queue based on said virtual queue or an acceptable rate computed by means of said rate computing means in said output buffer module section.

9. The ATM switching system of claim 8, wherein the buffer occupancy of an output line corresponding queue of said input buffer module section is observed for each logical channel, and wherein a packet is discarded when a buffer occupancy of the logical channel of said packet in said output line corresponding queue exceeds a predetermined threshold value upon arrival of the leading cell of said packet to said output line corresponding queue.

10. The ATM switching system of claim 9, wherein a value obtained by dividing a fixed threshold value by the number of active logical channels of said output line corresponding queue is used as a value compared with a buffer occupancy of the logical channel of said packet in said output line corresponding queue of said input buffer module section.

11. A back-pressure method in an ATM switching system, said ATM switching system comprising:
   a switch section for storing an ATM cell into a buffer to implement an ATM cell exchange between an input port and an output port at a predetermined transmission rate;
   an input buffer module section having a buffer that multiplexes plural input/output lines with a transmission rate slower than said predetermined transmission rate to the input port of said switch section and then stores said ATM cell; and
   a buffer module section for separating an output from the output port of said switch section into plural output lines with a transmission rate slower than said predetermined transmission rate and then storing said ATM cell;
   said input buffer module section which can queue said ATM cell to said buffer for each of the output lines and for each service class accommodated by said input buffer module section itself;
   said output buffer module section which can queue said ATM cell to said buffer for each destination output line and for each service class;

said output buffer module section including the steps of:
monitoring a total occupancy of said buffer and then transmitting a cell inhibit signal to said switch section to inhibit cell transmission when the total occupancy of said buffer exceeds a predetermined threshold value; and placing a queue for each of said output lines, monitoring the length of said queue, and transmitting a cell inhibit signal to all said input buffer module sections to inhibit cell transmission when the length of each of said queues exceeds a predetermined threshold value;

said switch section including the steps of:
placing a queue for each of said output ports, monitoring the length of said queue, and transmitting a cell inhibit signal to all said input buffer module section to inhibit cell transmission when each of said queues exceeds a predetermined threshold value; and halting a cell transmission to said output buffer module section to which said cell inhibit signal has originated;

said input buffer module section including:
halt control means for halting a cell transmission to said output port and said output line represented by said cell inhibit signal.

12. The back-pressure method in an ATM switching system of claim 11, wherein said output buffer module section further includes the step of periodically computing an acceptable rate of a queue for each of said output lines in said output buffer module section.

13. The back-pressure method in an ATM switching system of claim 12, further comprises the steps of respectively placing of an output line corresponding queues for said output lines in said input buffer module section and a virtual queue being a set of queues for the same output port among said queues, and controlling a cell transmission for each output line based on said acceptable rate, in said input buffer module section; and wherein said step of periodically computing said acceptable rate comprises the step of periodically computing an acceptable rate for each service class based on a status time change of said virtual queue by service class or said output line corresponding queue of said output buffer module section.

14. The back-pressure method in an ATM switching system of claim 13, further comprising the step of forming said output line corresponding queue of said input buffer module section so as to have a double structure including a first queue and a second queue in said input buffer module section, and controlling cell transfer from said first queue based on said computed acceptable rate.

15. The back-pressure method in an ATM switching system of claim 14, wherein said step of controllably using a cell transmission in said input buffer module section comprises the steps of controllably using as a transfer rate a smaller product among a product of an acceptance rate computed using said virtual queue for an output port corresponding to said output line corresponding queue and the number of active logical channels in which a cell is stored into an output line corresponding queue in said output buffer module section corresponding to said output line corresponding queue at a current time and a product of an acceptable rate computed using an output line corresponding queue in said output buffer module section corresponding to said output line corresponding queue and the number of active logical channels in said output line corresponding queue.

16. The back-pressure method in an ATM switching system of claim 11, further comprising the steps of:

observing the buffer occupancy of an output line corresponding queue of said input buffer module section for each logical channel, and discarding a packet when a buffer occupancy of the logical channel of said packet in said output line corresponding queue exceeds a predetermined threshold value upon arrival of the leading cell of said packet to said output line corresponding queue.

17. The back-pressure method in an ATM switching system of claim 11, wherein said packet discarding step comprises the step of using a value obtained by dividing a fixed threshold value by the number of active logical channels of said output line corresponding queue, as a value compared with a buffer occupancy of the logical channel of said packet in said output line corresponding queue of said input buffer module section.

18. The ATM switching system of claim 2, wherein the buffer occupancy of an output line corresponding queue of said input buffer module section is observed for each logical channel, and wherein a packet is discarded when a buffer occupancy of the logical channel of said packet in said output line corresponding queue exceeds a predetermined threshold value upon arrival of the leading cell of said packet to said output line corresponding queue.

19. The ATM switching system of claim 3, wherein the buffer occupancy of an output line corresponding queue of said input buffer module section is observed for each logical channel, and wherein a packet is discarded when a buffer occupancy of the logical channel of said packet in said output line corresponding queue exceeds a predetermined threshold value upon arrival of the leading cell of said packet to said output line corresponding queue.

20. The ATM switching system of claim 4, wherein the buffer occupancy of an output line corresponding queue of said input buffer module section is observed for each logical channel, and wherein a packet is discarded when a buffer occupancy of the logical channel of said packet in said output line corresponding queue exceeds a predetermined threshold value upon arrival of the leading cell of said packet to said output line corresponding queue.

21. The ATM switching system of claim 5, wherein the buffer occupancy of an output line corresponding queue of said input buffer module section is observed for each logical channel, and wherein a packet is discarded when a buffer occupancy of the logical channel of said packet in said output line corresponding queue exceeds a predetermined threshold value upon arrival of the leading cell of said packet to said output line corresponding queue.

22. The ATM switching system of claim 18, wherein a value obtained by dividing a fixed threshold value by the number of active logical channels of said output line corresponding queue is used as a value compared with a buffer occupancy of the logical channel of said packet in said output line corresponding queue is used as a value compared with a buffer occupancy of the logical channel of said packet in said output line corresponding queue of said input buffer module action.

23. The ATM switching system of claim 19, wherein a value obtained by dividing a fixed threshold value by the number of active logical channels of said output line corresponding queue is used as a value compared with a buffer occupancy of the logical channel of said packet in said output line corresponding queue is used as a value compared with a buffer occupancy of the logical channel of said packet in said output line corresponding queue of said input buffer module action.

24. The ATM switching system of claim 20, wherein a value obtained by dividing a fixed threshold value by the number of active logical channels of said output line corresponding queue is used as a value compared with a buffer occupancy of the logical channel of said packet in said output line corresponding queue is used as a value compared with a buffer occupancy of the logical channel of said packet in said output line corresponding queue of said input buffer module action.

25. The ATM switching system of claim 21, wherein a value obtained by dividing a fixed threshold value by the number of active logical channels of said output line corresponding queue is used as a value compared with a buffer occupancy of the logical channel of said packet in said output line corresponding queue is used as a value compared with a buffer occupancy of the logical channel of said packet in said output line corresponding queue of said input buffer module action.

* * * * *